US012075128B2

(12) United States Patent
Zheng

(10) Patent No.: US 12,075,128 B2
(45) Date of Patent: Aug. 27, 2024

(54) METHOD AND APPARATUS FOR PLAYING VIDEO SIGNAL OF MULTI-USER INTERACTION, AND DEVICE

(71) Applicant: TENCENT TECHNOLOGY (SHENZHEN) COMPANY LIMITED, Shenzhen (CN)

(72) Inventor: Shuyuan Zheng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/962,466

(22) Filed: Oct. 8, 2022

(65) Prior Publication Data

US 2023/0034686 A1 Feb. 2, 2023

Related U.S. Application Data

(63) Continuation of application No. PCT/CN2021/138604, filed on Dec. 16, 2021.

(30) Foreign Application Priority Data

Dec. 31, 2020 (CN) .......................... 202011628456.4

(51) Int. Cl.
*G06F 3/00* (2006.01)
*G06F 13/00* (2006.01)
(Continued)

(52) U.S. Cl.
CPC ..... *H04N 21/4781* (2013.01); *H04N 21/2187* (2013.01); *H04N 21/47205* (2013.01)

(58) Field of Classification Search
CPC .......... H04N 21/4781; H04N 21/2187; H04N 21/47205; H04N 21/4312; H04N 21/4316;
(Continued)

(56) References Cited

U.S. PATENT DOCUMENTS

2009/0138619 A1* 5/2009 Schnizlein .......... H04L 63/0892
709/245
2014/0256389 A1* 9/2014 Wentling ................ A63F 13/63
463/2
(Continued)

FOREIGN PATENT DOCUMENTS

CN 105025314 A 11/2015
CN 106937131 A 7/2017
(Continued)

OTHER PUBLICATIONS

Du et al, translation version of CN-111818394A, Oct. 23, 2020 (Year: 2020).*
(Continued)

*Primary Examiner* — Gigi L Dubasky
(74) *Attorney, Agent, or Firm* — ANOVALAW GROUP PLLC

(57) ABSTRACT

A method for playing a video signal of multi-user interaction includes: generating a video playing interface of a live streaming room; switching an operation mode of the video playing interface from a viewer mode to an anchor mode in response to an anchor mode switching instruction, where in the anchor mode, the video playing interface includes a display item of at least one multi-user interaction activity; generating a live streaming instruction for the first multi-user interaction activity in the at least one multi-user interaction activity in response to a trigger operation for a display item corresponding to a first multi-user interaction activity in the at least one multi-user interaction activity; and playing a live streaming video signal of the first multi-user interaction activity in response to the live streaming instruction for the first multi-user interaction activity.

20 Claims, 24 Drawing Sheets

(51) Int. Cl.
*H04N 5/445* (2011.01)
*H04N 21/2187* (2011.01)
*H04N 21/472* (2011.01)
*H04N 21/478* (2011.01)

(58) Field of Classification Search
CPC ............ H04N 21/4753; H04N 21/4788; H04L 65/75; H04L 65/80
See application file for complete search history.

(56) References Cited

U.S. PATENT DOCUMENTS

| | | | |
|---|---|---|---|
| 2018/0353860 A1* | 12/2018 | Nakamura | ............... A63F 13/31 |
| 2019/0262727 A1 | 8/2019 | Trombetta et al. | |
| 2021/0248803 A1 | 8/2021 | Kojima et al. | |
| 2022/0339535 A1* | 10/2022 | Shibata | ................... A63F 13/35 |

FOREIGN PATENT DOCUMENTS

| | | | |
|---|---|---|---|
| CN | 110213601 A | | 9/2019 |
| CN | 111818394 A | * | 10/2020 ............. H04L 65/40 |
| CN | 112076472 A | | 12/2020 |
| CN | 112717423 A | | 4/2021 |
| CN | 112788358 A | | 5/2021 |
| JP | 2004015749 A | | 1/2004 |
| JP | 2020091504 A | | 6/2020 |
| WO | 2016158075 A1 | | 10/2016 |
| WO | 2017030844 A1 | | 2/2017 |
| WO | 2019168630 A2 | | 9/2019 |

OTHER PUBLICATIONS

The World Intellectual Property Organization (WIPO) International Search Report for PCT/CN2021/138604 Mar. 1, 2022 7 Pages (including translation).
The Japan Patent Office (JPO) Notification of Reasons for Refusal for Application No. 2023-521950 and Translation May 7, 2024 13 Pages.

* cited by examiner

METHOD AND APPARATUS FOR PLAYING VIDEO SIGNAL OF MULTI-USER INTERACTION, AND DEVICE

CROSS-REFERENCES TO RELATED APPLICATIONS

This application is a continuation application of PCT Patent Application No. PCT/CN2021/138604, entitled "VIDEO SIGNAL PLAYING METHOD, APPARATUS, AND DEVICE FOR MULTI-USER INTERACTION" and filed on Dec. 16, 2021, which claims priority to Chinese Patent Application No. 202011628456.4, entitled "METHOD FOR LIVE-STREAMING VIDEO, METHOD FOR TRANSMITTING VIDEO, APPARATUS, AND DEVICE OF GAME PLAYING" and filed with the China National Intellectual Property Administration on Dec. 31, 2020, the entire contents of both of which are incorporated herein by reference.

FIELD OF THE TECHNOLOGY

The embodiments of the present disclosure relate to the technical field of Internet, and in particular to a method and apparatus for playing a video signal of multi-user interaction, and a device.

BACKGROUND OF THE DISCLOSURE

With the development of the times, the emergence of live streaming has enriched the leisure-time activities of users.

In the related technologies, when an anchor starts live streaming, the mobile phone of the anchor starts to record the screen and sound, and transmits the operation interface and sound to a server, so that the server can transmit the operation interface and sound back to the live streaming room in real time. When the audience enters the live streaming room, the audience can see that the operation interface of the anchor's mobile phone is live-streaming the game.

SUMMARY

An embodiment of the present disclosure provides a method for playing a video signal of multi-user interaction, executed by a first terminal, the method including:
  generating a video playing interface of a live streaming room, the video playing interface being configured to play a multi-user interactive live streaming video signal initiated in the live streaming room: switching an operation mode of the video playing interface from a viewer mode to an anchor mode in response to an anchor mode switching instruction, where in the anchor mode, the video playing interface includes a display item of at least one multi-user interaction activity: generating a live streaming instruction for a first multi-user interaction activity in the at least one multi-user interaction activity in response to a trigger operation for a display item corresponding to the first multi-user interaction activity in the at least one multi-user interaction activity: and playing a live streaming video signal of the first multi-user interaction activity in the video playing interface in response to the live streaming instruction for the first multi-user interaction activity, the live streaming video signal of the first multi-user interaction activity being transmitted to a client on a second terminal logged in by at least one user account in the live streaming room for playing.

An embodiment of the present disclosure provides a method for playing a video signal of multi-user interaction, executed by a server, the method including: receiving a permission verification request from a first terminal, the permission verification request including a first user account and an ID of a live streaming room of a target group: determining, based on the first user account and the ID of the live streaming room, a verification result, the verification result being used for indicating whether the first user account has an anchor permission; and transmitting anchor mode configuration information to the first terminal when the first user account is determined to have the anchor permission, so that the first terminal configures an anchor mode based on the anchor mode configuration information, and switches an operation mode of the video playing interface from a viewer mode to the anchor mode, the video playing interface being configured to play a multi-user interactive live streaming video signal initiated in the live streaming room.

An embodiment of the present disclosure provides a method for transmitting a video signal of a multi-user interaction activity, the method including: receiving a video acquisition request from a client, the video acquisition request including ID information of a first multi-user interaction activity, the first multi-user interaction activity being a multi-user interaction activity initiated in a live streaming room of a target group: acquiring, based on the ID information of the first multi-user interaction activity, video data of the first multi-user interaction activity: and transmitting the video data to the client, the video data including a live streaming video screen of the first multi-user interaction activity, the live streaming video of the first multi-user interaction activity being pushed to the client logged in by at least one user account in the live streaming room for playing.

An embodiment of the present disclosure provides an apparatus for playing a video signal of multi-user interaction, the apparatus including: an interface generation module, configured to generate a video playing interface of a live streaming room, the video playing interface being configured to play a multi-user interactive live streaming video signal initiated in the live streaming room: a mode switching module, configured to switch an operation mode of the video playing interface from a viewer mode to an anchor mode in response to an anchor mode switching instruction, where in the anchor mode, the video playing interface includes a display item of at least one multi-user interaction activity: an instruction generation module, configured to generate a live streaming instruction for the first multi-user interaction activity in the at least one multi-user interaction activity in response to a trigger operation for a display item corresponding to a first multi-user interaction activity in the at least one multi-user interaction activity: and a screen playing module, configured to play a live streaming video signal of the first multi-user interaction activity in the video playing interface in response to the live streaming instruction for the first multi-user interaction activity, the live streaming video signal of the first multi-user interaction activity being transmitted to a client on a second terminal logged in by at least one user account in the live streaming room for playing.

An embodiment of the present disclosure provides a computer device, including a processor and a memory, the memory storing at least one instruction, at least one program, a code set, or an instruction set, the at least one instruction, the at least one program, the code set, or the instruction set being loaded and executed by the processor to implement the method for playing a video signal of multi-user interaction on a terminal side described in the foregoing aspects, or the method for playing a video signal of multi-user interaction on a server side described in the foregoing aspects.

In some embodiments, the computer device includes a terminal and a server.

An embodiment of the present disclosure provides a non-transitory computer-readable storage medium, the storage medium storing at least one instruction, at least one program, a code set, or an instruction set, the at least one instruction, the at least one program, the code set, or the instruction set being loaded and executed by a processor to implement the method for playing a video signal of multi-user interaction on a terminal side described in the foregoing aspects, or the method for playing a video signal of multi-user interaction on a server side described in the foregoing aspects.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the implementations of the present disclosure in detail with reference to the accompanying drawings.

First, related terms involved in the embodiments of the present disclosure are explained.

Microphone seat: a live streaming room seat capable of making a public voice in a live streaming room. A microphone seat can be used for interaction in the live streaming room.

Microphone on: joining a microphone seat in the live streaming room.

Microphone off: exiting a microphone seat in the live streaming room.

Game live streaming: forming a video from a real-time screen of game playing and playing it in a terminal.

Anchor: a person who is in charge of interacting with the audience and presiding over in the live streaming room.

Figure 1:
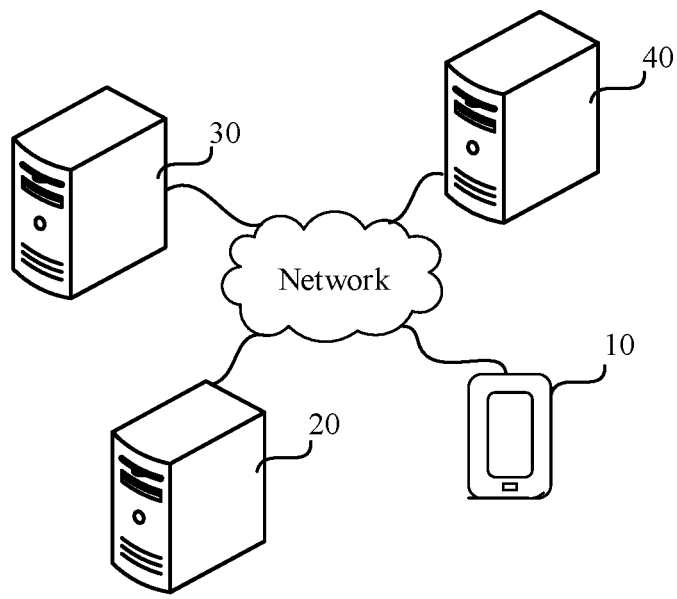
FIG. 1 is a schematic diagram of a system for playing a video signal of multi-user interaction according to an embodiment of the present disclosure.

Referring to FIG. 1, it illustrates a schematic diagram of a system for playing a video signal of multi-user interaction according to an embodiment of the present disclosure. The system may include: a terminal 10, a multi-user interaction cloud server 20, a back-end server 30 and a server 40.

The terminal 10 can be used by a user, who can switch between the identities of the anchor and the audience. The terminal 10 may refer to an electronic device with a function of commenting a live streaming video or watching the live streaming video. The terminal 10 may be an electronic device such as a mobile phone, a tablet computer, a wearable device, or a personal computer (PC). The terminal 10 may be installed with a live streaming client. The live streaming client refers to a client used by the user to comment the live streaming video or watch the live streaming video. The live streaming client may have functions of acquiring, releasing, downloading and playing the live streaming video.

In an exemplary embodiment, the terminal 10 is provided with a display screen and/or an audio acquisition device, the display screen is configured to display the live streaming video, and the audio acquisition device is configured to acquire audio data of the anchor.

In one embodiment, the live streaming client further provides a function of creating a team. For the terminal used by the user in the team, in addition to the live streaming client, the terminal may further be installed with a multi-user interaction application client, such as video conference client or game client.

Exemplarily, the game client may be a client of any game such as shooting game, first-person shooting game, third-person shooting game, multiplayer gunfight survival game, multiplayer online battle arena game, role-playing game, real-time strategy game, racing game, or music game. Exemplarily, the live streaming client has a permission to pull up the game client. Exemplarily, the live streaming client corresponds to a first user account, and the multi-user interaction application client corresponds to a second user account.

The multi-user interaction cloud server 20 refers to a server that provides cloud services for multi-user interaction, such as cloud game server. The multi-user interaction cloud server may include one cloud server or multiple cloud servers, which is not limited in this embodiment of the present disclosure.

The back-end server 30 refers to a server that provides back-end services for the live streaming client. The back-end server 30 may include one server or multiple servers, which is not limited in this embodiment of the present disclosure. Exemplarily, the back-end server 30 may also be a cloud server.

The multi-user interaction server 40 refers to a server that provides back-end services for the multi-user interaction client, such as game server. The multi-user interaction server 40 may include one server or multiple servers, which is not limited in this embodiment of the present disclosure.

Exemplarily, the terminal 10, the multi-user interaction cloud server 20, the back-end server 30, and the multi-user interaction server 40 may communicate with each other. For example, the terminal 10 and the multi-user interaction cloud server 20 may communicate with each other through a wired network or a wireless network: the terminal 10 and the back-end server 30 may communicate with each other through a wired network or a wireless network: the terminal 10 and the multi-user interaction server 40 may communicate with each other through a wired network or a wireless network: the multi-user interaction cloud server 20 and the back-end server 30 may communicate with each other through a wired network or a wireless network: the multi-user interaction cloud server 20 and the multi-user interaction server 40 may communicate with each other through a wired network or a wireless network: the back-end server 30 and the multi-user interaction server 40 may communicate with each other through a wired network or a wireless network.

For the convenience of introduction and description, the multi-user interaction server, the multi-user interaction cloud server and the back-end server will be collectively referred to as the server, but this does not limit the present disclosure.

Next, several embodiments of the present disclosure will be described.

The method for playing the video signal of multi-user interaction according to this embodiment of the present disclosure can be applied to a scenario of multi-party video conference.

In some embodiments, it can also be applied to live streaming processes of videos of virtual reality application programs, three-dimensional map programs, action simulation programs, and game application programs such as First-Person Shooting (FPS) games and Multiplayer Online Battle Arena (MOBA) games.

In the related technologies, the live streaming operation in the live streaming room can only be initiated by the anchor, and the audience can only watch as the audience. The two identities cannot be switched, and the flexibility is poor.

Based on this, the embodiments of the present disclosure disclose a method and apparatus for playing a video signal of multi-user interaction, and a device, which realize the switching between the identities of anchor and audience and have the advantages of high flexibility.

Figure 2:
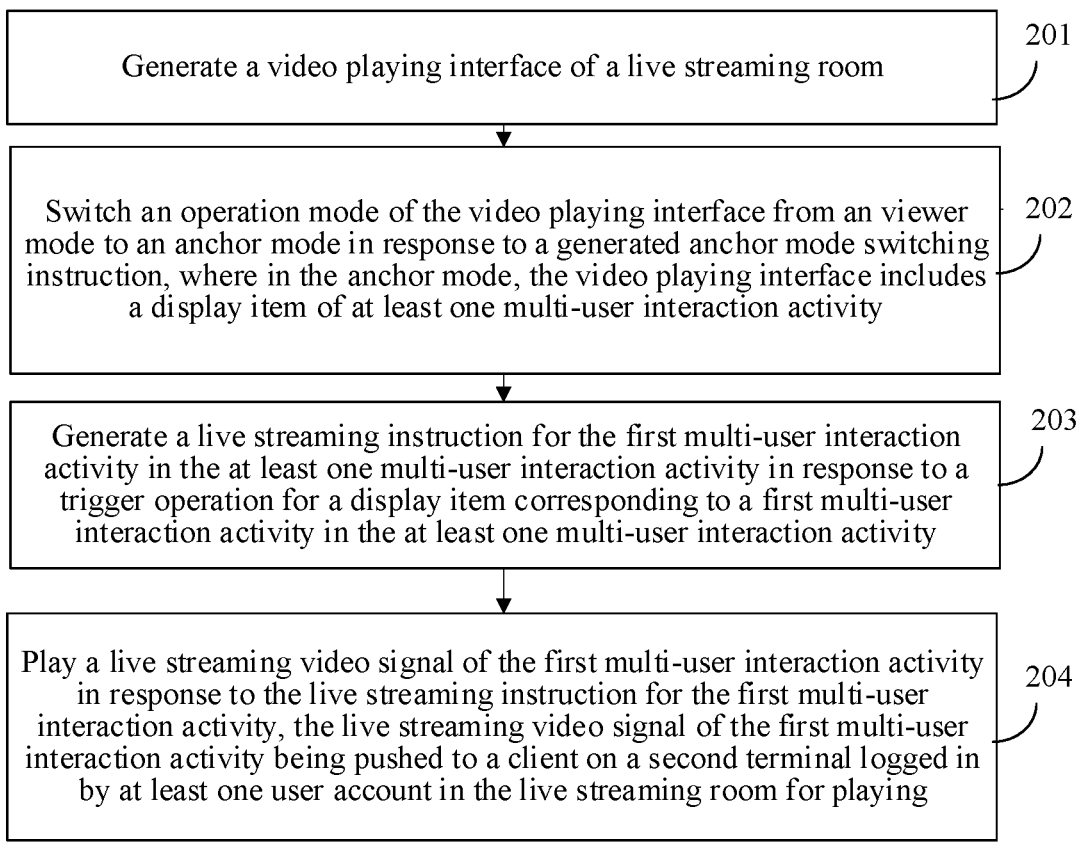
FIG. 2 is a flowchart of a method for playing a video signal of multi-user interaction according to an embodiment of the present disclosure.

FIG. 2 illustrates a flowchart of a method for playing a video signal of multi-user interaction according to an embodiment of the present disclosure. The method can be applied to the terminal illustrated in FIG. 1. Exemplarily, the method can be executed by the live streaming client in the terminal. The method may include the following steps:

In step 201, a video playing interface of a live streaming room is generated.

In some embodiments, in response to a user's opening operation for a live streaming room of a target group in a live streaming client, the live streaming client generates a video playing interface of the live streaming room of the target group. The video playing interface is used for playing a live streaming video signal of a multi-user interaction activity initiated in the live streaming room. The live streaming video signal may be a live streaming video screen.

In some embodiments, the target group may be any group. The group refers to a platform that gathers at least one user. The at least one user may be users with the same hobbies or characteristics. Exemplarily, the group can also be called a trade union community. Of course, in some other embodiments, the group can also be called in other ways, which is not limited in this embodiment of the present disclosure.

Exemplarily, the live streaming in this embodiment of the present disclosure may also be web live streaming, which refers to that the anchor sets up an independent signal acquisition device on the site, uploads acquired audios and/or videos to the server through the network, and then releases them to other users for watching. The live streaming room can also be called a room, which refers to a web live streaming program opened by the anchor user. Of course, in some other embodiments, the live streaming room can also be called in other ways, which is not limited in this embodiment of the present disclosure.

Exemplarily, the target group can be carried in the form of live streaming room. The live streaming room can support multi-party video conferences, game playing, game live streaming and group chatting. Next, the structure of the live streaming room will be described.

Figure 3:
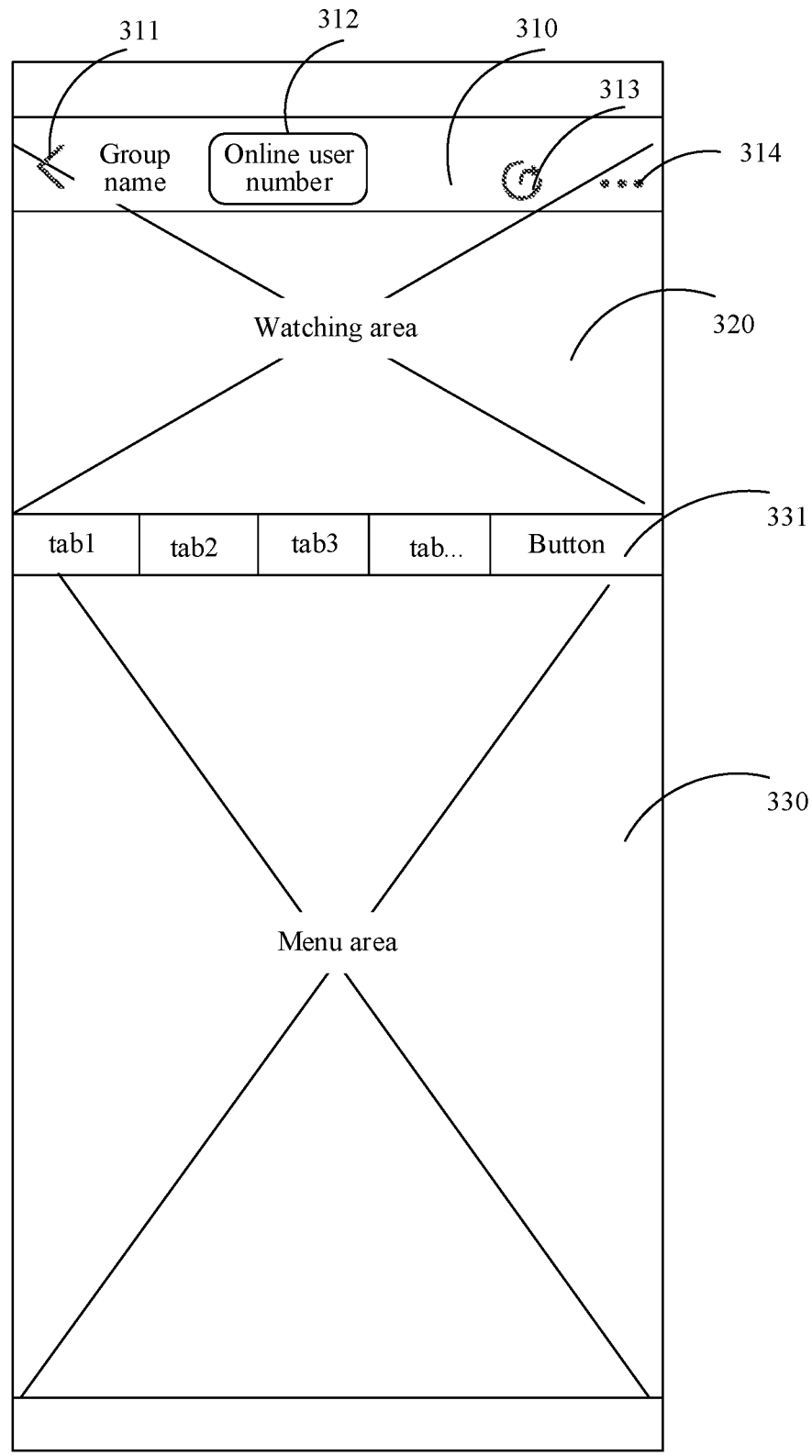
FIG. 3 is a schematic structural diagram of a live streaming room according to an embodiment of the present disclosure.

Referring to FIG. 3, it illustrates a schematic structural diagram of a live streaming room according to an embodiment of the present disclosure. The live streaming room is mainly composed of the following three parts: a basic function area 310, a watching area 320 and a menu area 330. The basic function area 310 refers to an area that provides basic functions. The basic function area 310 includes a return control 311, an online user number display control 312, a live streaming room sharing control 313, and a live streaming room setting control 314. The watching area 320, as the resident area of the live streaming room, provides interactive content display in the live streaming room, including display items of game live streaming video, game playing, etc. As a social function and function extension area of the live streaming room, the menu area 330 provides functions of social chatting, team forming for game playing, group personnel information display and management, and list. Exemplarily, the menu area 330 includes a live streaming room menu tab area 331. The live streaming room menu tab area 331 includes at least one tab. The user can switch to open different function pages by clicking to switch the tab.

In this embodiment of the present disclosure, the video playing interface is used for playing the live streaming video signal of the multi-user interaction activity initiated in the live streaming room. Exemplarily, the user can initiate the multi-user interaction activity in the live streaming room, and other users can watch the multi-user interaction activity.

In step 202, in response to an anchor mode switching instruction, an operation mode of the video playing interface is switched from a viewer mode to an anchor mode. In the anchor mode, the video playing interface includes a display item of at least one multi-user interaction activity.

The anchor mode switching instruction refers to an instruction to switch the viewer mode to the anchor mode. The anchor mode refers to a mode in which the user has the anchor permission and live-streams the multi-user interactive video signal. The viewer mode refers to a mode in which the user only has the permission to watch the video signal live-streamed by another user with the anchor permission.

In some embodiments, the live streaming client in the terminal generates an anchor mode switching option; and in response to a selection operation for the anchor mode switching option, generates the anchor mode switching instruction and switches the operation mode of the video playing interface from the viewer mode to the anchor mode according to the anchor mode switching instruction. The anchor mode switching option may be an anchor microphone seat option for triggering the switching of the operation mode from the viewer mode to the anchor mode.

In some embodiments, in response to the generated anchor mode switching instruction, a permission verification request is transmitted to a server, and the permission verification request is used for requesting to verify whether a currently logged-in first user account has an anchor permission: receiving anchor mode configuration information from the server, the anchor mode configuration information being transmitted by the server when the first user account is determined to have the anchor permission: configuring the anchor mode based on the anchor mode configuration information: and switching the operation mode from the viewer mode to the anchor mode.

The operation mode of the video playing interface may be related to its running mode, which is a mode presented to the user by the live streaming client for user operation.

In this embodiment of the present disclosure, the display item of the multi-user interaction activity is used for displaying the multi-user interaction activity. Exemplarily, the display item of the multi-user interaction activity may be an option of forming a team of the multi-user interaction activity in the live streaming room. The display item of the multi-user interaction activity may be in the form of card. Exemplarily, the display item of at least one multi-user interaction activity included in the video playing interface may correspond to the same multi-user interaction activity, the same interaction activity type, or different interaction activity types. The interaction activity type corresponding to the display item of at least one multi-user interaction activity is not limited in this embodiment of the present disclosure. The display item of the at least one multi-user interaction activity may be displayed according to the creation time of the display item, for example, from morning to night according to the creation time.

In an example, the number of the display items of the multi-user interaction activities included in the video playing interface may be a preset number, which may be set by the developer. When the number of the display items of the multi-user interaction activities exceeds the preset number, the display items of the multi-user interaction activities that have been ended may not be displayed in the video live streaming interface: In another example, the number of the display items of the multi-user interaction activities included in the video playing interface may be any number, that is, the number of the display items of the multi-user interaction activities included in the video playing interface is not limited.

In one embodiment, the display item of the at least one multi-user interaction activity includes the display items of the ongoing multi-user interaction activities and the display items of the multi-user interaction activities that have not started. For example, the display items of the ongoing multi-user interaction activities are included in the video playing interface only in the anchor mode, and in the viewer mode, the display items of the ongoing multi-user interaction activities are not included in the video playing interface, but only the display items of the multi-user interaction activities that have not started are included.

In step 203, in response to a trigger operation for a display item corresponding to a first multi-user interaction activity in the at least one multi-user interaction activity, a live streaming instruction for the first multi-user interaction activity in the at least one multi-user interaction activity is generated.

In this embodiment of the present disclosure, the display item of the multi-user interaction activity includes a live streaming trigger control corresponding to the multi-user interaction activity: the trigger operation for the display item corresponding to the first multi-user interaction activity may be a user's touch operation for the live streaming trigger control included in the display item corresponding to the first multi-user interaction activity; and in response to the trigger operation for the live streaming trigger control in the display item corresponding to the first multi-user interaction activity, the live streaming instruction for the first multi-user interaction activity is generated.

The live streaming instruction refers to an instruction to initiate live streaming. In this embodiment of the present disclosure, the live streaming instruction refers to an instruction to live-stream the first multi-user interaction activity.

The first multi-user interaction activity may be any one of the at least one multi-user interaction activity, and the first multi-user interaction activity may be a multi-user interaction activity in which a game is being played or a multi-user interaction activity in which a game has not been played.

In step 204, in response to the live streaming instruction for the first multi-user interaction activity, a live streaming video signal of the first multi-user interaction activity is played in the video playing interface. The live streaming video signal of the first multi-user interaction activity is pushed to a client on a second terminal logged in by at least one user account in the live streaming room for playing.

In some embodiments, a video acquisition request is transmitted to a server. The video acquisition request is used for requesting to acquire the live streaming video signal of the first multi-user interaction activity: receiving video data from the server, the video data including the live streaming video signal of the first multi-user interaction activity: and playing the live streaming video signal of the first multi-user interaction activity in the video playing interface based on the video data.

In one embodiment, the anchor may perform live streaming as a participant in the multi-user interaction activity, or may perform live streaming as a non-participant in the interaction activity.

When the live streaming instruction for the first multi-user interaction activity is received, the terminal plays a live streaming video signal of the first multi-user interaction activity. The live streaming video signal of the first multi-user interaction activity is further pushed to a client logged in by at least one user account in the live streaming room for playing.

In some embodiments, after the live streaming video signal of the first multi-user interaction activity is played, commenting audio data of the first multi-user interaction activity is acquired. where the commenting audio data of the first multi-user interaction activity and the live streaming video signal of the first multi-user interaction activity are synchronously pushed to a client on a second terminal logged in by at least one user account in the live streaming room for playing.

In some embodiments, after the live streaming video signal of the first multi-user interaction activity is played, the method further includes: displaying an observer (OB) setting interface in response to an opening operation for the observer OB setting interface corresponding to the first multi-user interaction activity: and playing the adjusted live streaming video signal of the first multi-user interaction activity in response to a setting operation in the OB setting interface.

transmitting setting information to a server in response to the setting operation in the OB setting interface, the setting information being used for indicating the setting operation: receiving adjusted video data from the server, the adjusted video data including the adjusted live streaming video signal of the first multi-user interaction activity, the adjusted live streaming video signal of the first multi-user interaction activity referring to the live streaming video signal adjusted based on the setting information: and playing the adjusted live streaming video signal of the first multi-user interaction activity.

In some embodiments, in response to a viewer mode switching instruction, the operation mode is switched from the anchor mode to the viewer mode; an interaction activity initiation instruction for a second multi-user interaction activity in the at least one multi-user interaction activity is received: and displaying a game playing interface of the second multi-user interaction activity.

To sum up, in the technical solution provided by this embodiment of the present disclosure, when the anchor mode switching instruction is received, the operation mode of the video playing interface is switched from the viewer mode to the anchor mode, so as to realize live streaming of the multi-user interaction activity. The operation mode of the client provided by this embodiment of the present disclosure includes the viewer mode and the anchor mode, and the user can select to switch the operation mode of the client by himself, thus realizing the user's switching between the two identities of the anchor and the audience, and achieving high flexibility.

In addition, this embodiment of the present disclosure combines the viewer mode and the anchor mode into one client, thus avoiding the problem of downloading the anchor live streaming assistant in the related technology, saving the hardware resources and network resources occupied by the anchor in the operation process, simplifying the anchor operation process, and reducing the anchor operation cost.

In addition, this embodiment of the present disclosure does not rely on the anchor to generate live streaming content. The live streaming room provided in this embodiment of the present disclosure can be divided into two roles of player and watcher. The anchor can also watch the game as an audience. Compared with the related technologies in which the anchor needs to focus on the multi-user interaction activity as a participant in the multi-user interaction activity, this embodiment of the present disclosure does not require the anchor to focus on the multi-user interaction activity, thus facilitating the interaction between the anchor and the audience, and improving the conversion rate of interaction between the audience and the anchor.

The method for playing the video signal of multi-user interaction provided by this embodiment of the present disclosure will be described below by taking that the multi-user interaction activity is game playing as an example. Game playing refers to game playing in which different virtual objects are controlled by user accounts to battle. Exemplarily, the user can initiate game plying in the live streaming room, and other users can watch the game playing.

Figure 4:
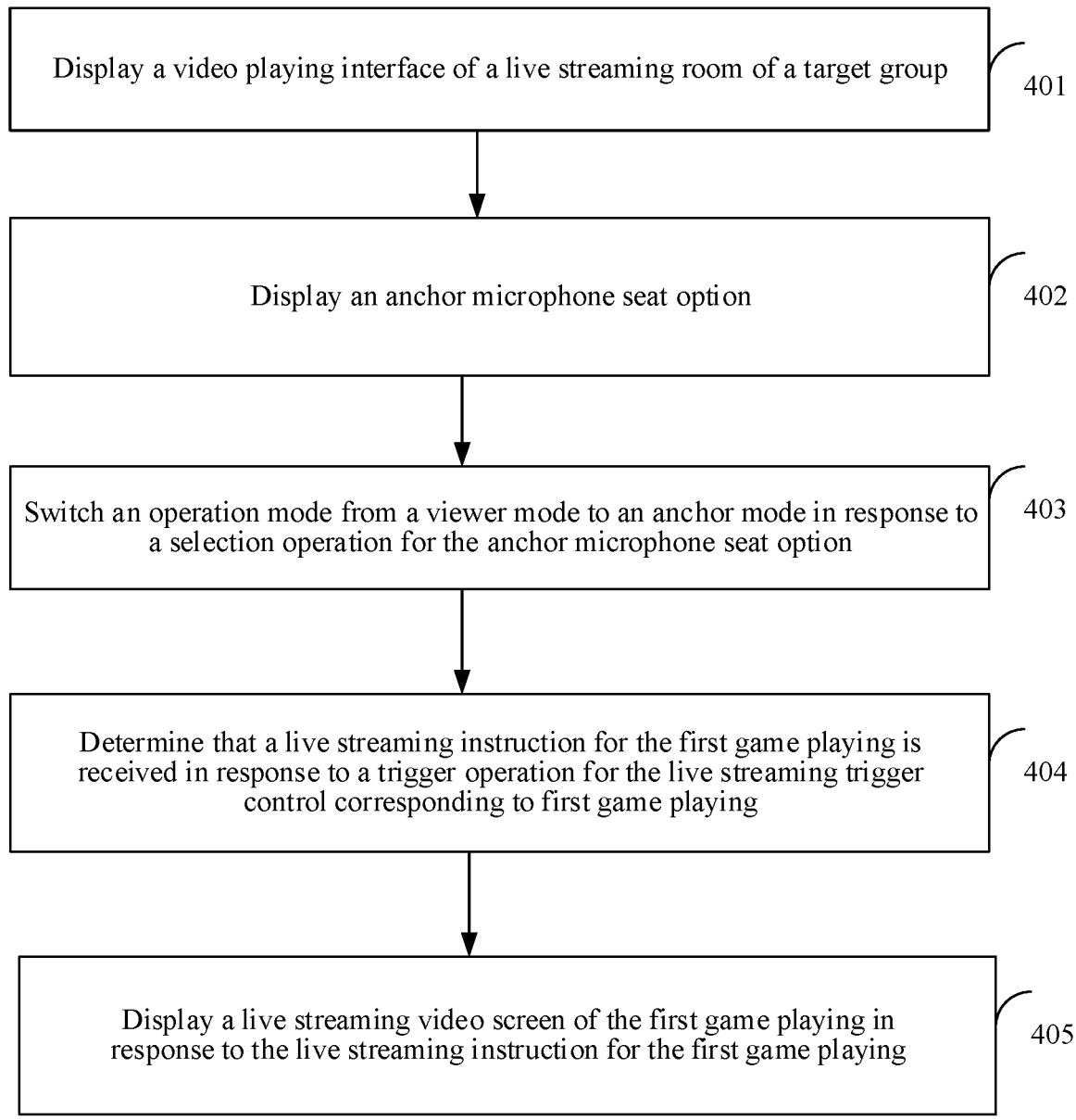
FIG. 4 is a flowchart of a method for playing a video signal of multi-user interaction according to another embodiment of the present disclosure.

FIG. 4 illustrates a flowchart of a method for playing a video signal of multi-user interaction according to an embodiment of the present disclosure. The method can be applied to the terminal illustrated in FIG. 1. The method may include the following steps:

In step 401, a video playing interface of a live streaming room of a target group is displayed.

In this embodiment of the present disclosure, the video playing interface is used for playing the live streaming video signal of the game playing initiated in the live streaming room.

For descriptions of the step 401, reference may be made to the embodiments above, and details are not described herein.

In step 402, an anchor microphone seat option is displayed.

Figure 5:
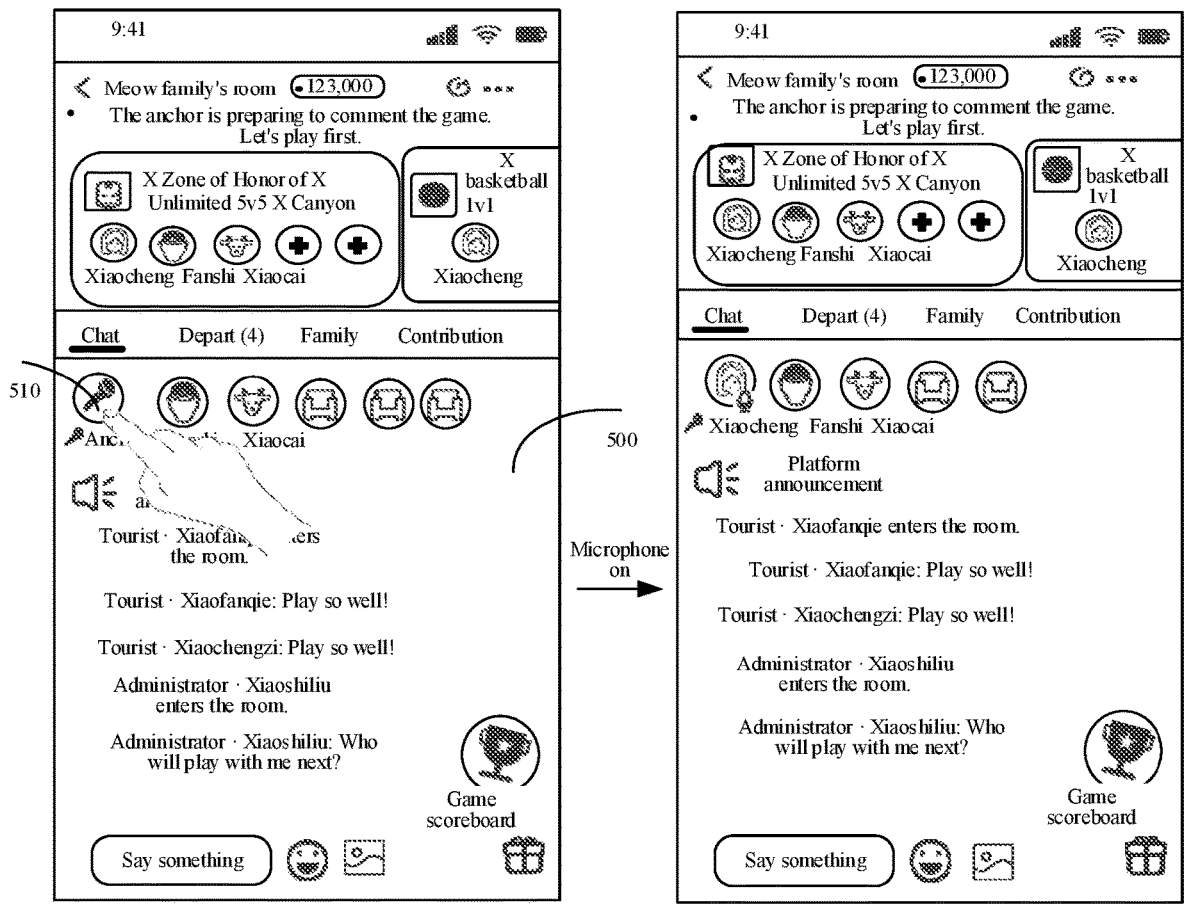
FIG. 5 is a schematic diagram of a video playing interface according to an embodiment of the present disclosure.

The anchor microphone seat option refers to an option used for triggering the switching of the operation mode from the viewer mode to the anchor mode. Referring to FIG. 5, it illustrates a schematic diagram of a video playing interface according to an embodiment of the present disclosure. A video playing interface 500 includes an anchor microphone seat option 510. Exemplarily, the anchor microphone seat option is displayed on the chatting page corresponding to the "chat" tab.

In step 403, in response to a selection operation for the anchor microphone seat option, an operation mode is switched from a viewer mode to an anchor mode.

Exemplarily, in response to a selection operation for the anchor microphone seat option, an anchor mode switching instruction is generated in a live streaming client in a terminal, and the operation mode of the video playing interface is switched from the viewer mode to the anchor mode according to the anchor mode switching instruction. The selection operation for the anchor microphone seat option may be triggered by touch, voice, gesture, etc. Description will be made below by taking that the selection operation for the anchor microphone seat option is triggered by touch as an example. Referring to FIG. 5, when the user clicks the anchor microphone seat option 510, the terminal switches the operation mode from the viewer mode to the anchor mode. Exemplarily, the terminal switches the operation mode from the viewer mode to the anchor mode, that is, the identity of the user is switched from the audience to the anchor. This process can be referred to as "microphone on". When the user switches from the audience to the anchor, the head portrait corresponding to the user account of the user can be displayed on the head portrait corresponding to the anchor.

In the anchor mode, the video playing interface includes at least one display item of the game playing, and the display item of the game playing includes a live streaming trigger control corresponding to the game playing.

In some embodiments, switching the operation mode of the video playing interface from the viewer mode to the anchor mode according to the generated anchor mode switching instruction can avoid the situation that the user downloads an additional live streaming application program, thus saving network resources and reducing operation costs.

In step 404, in response to a trigger operation for the live streaming trigger control corresponding to first game playing, it is determined that a live streaming instruction for the first game playing is received.

The live streaming trigger control refers to a control that triggers the initiation of live streaming. Exemplarily, the trigger operation for the live streaming trigger control may be triggered by touch, voice, gesture, etc.

Figure 6:
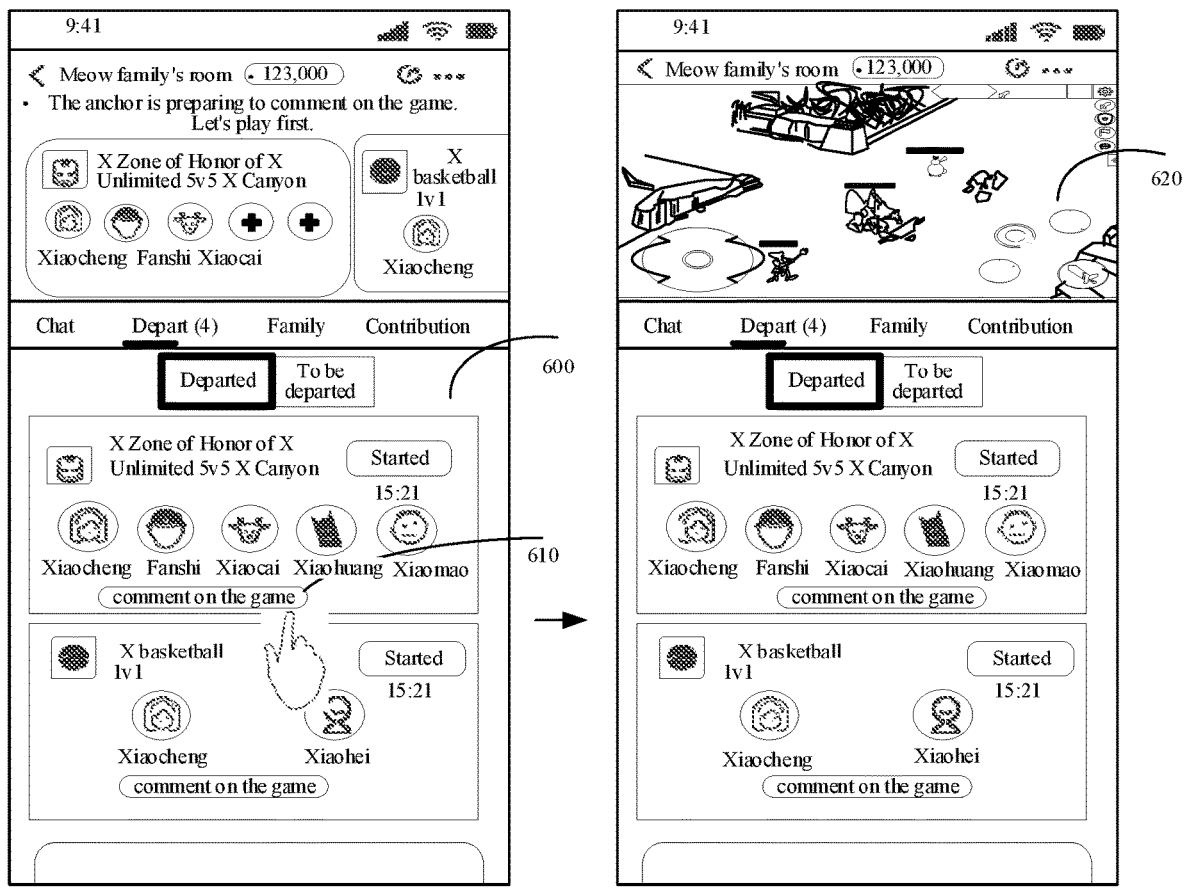
FIG. 6 is a schematic diagram of a video playing interface according to another embodiment of the present disclosure.

Referring to FIG. 6, it illustrates a schematic diagram of a video live streaming interface according to another embodiment of the present disclosure. A "depart" page corresponding to the "depart" tab in a video live streaming interface 600 includes a "departed" list and a "to be departed" list. The "departed" list is used for displaying the display items of the game playing that is in progress, and the "to be departed" list is used for displaying the display items of the game playing that is not in progress. The anchor can arbitrarily select to trigger the live streaming trigger control included in the display item of game playing in the "departed" list. Description will be made below by taking that the trigger operation for the live streaming trigger control is triggered by touch as an example. Referring to FIG. 6, the anchor touches the live streaming trigger control 610 in the display item of the game playing named "X Zone of Honor of X".

In this embodiment of the present disclosure, the anchor can generate a live streaming instruction for the first multi-user interaction activity by triggering the live streaming trigger control according to his own needs. In this way, through rapid and accurate identification of the user instruction, he can independently and flexibly select a certain multi-user interaction activity for live streaming, thus improving the running efficiency of the terminal.

In step 405, in response to a live streaming instruction for the first game playing, a live streaming video signal of the first game playing is displayed.

In this embodiment of the present disclosure, the live streaming video signal of the first game playing is pushed to a client logged in by at least one user account in the live streaming room for displaying. As described above, the live streaming video signal may be a live streaming video screen.

Referring to FIG. 6, after the anchor touches the live streaming trigger control 610 in the display item of the game playing named "X Zone of Honor of X", the terminal displays a live streaming video screen 620 of the first game playing.

To sum up, in the technical solution provided by this embodiment of the present disclosure, the operation mode is switched from the viewer mode to the anchor mode by receiving the selection operation for the anchor microphone seat option. The switching process of the anchor mode is simple and easy to operate.

Figure 7:
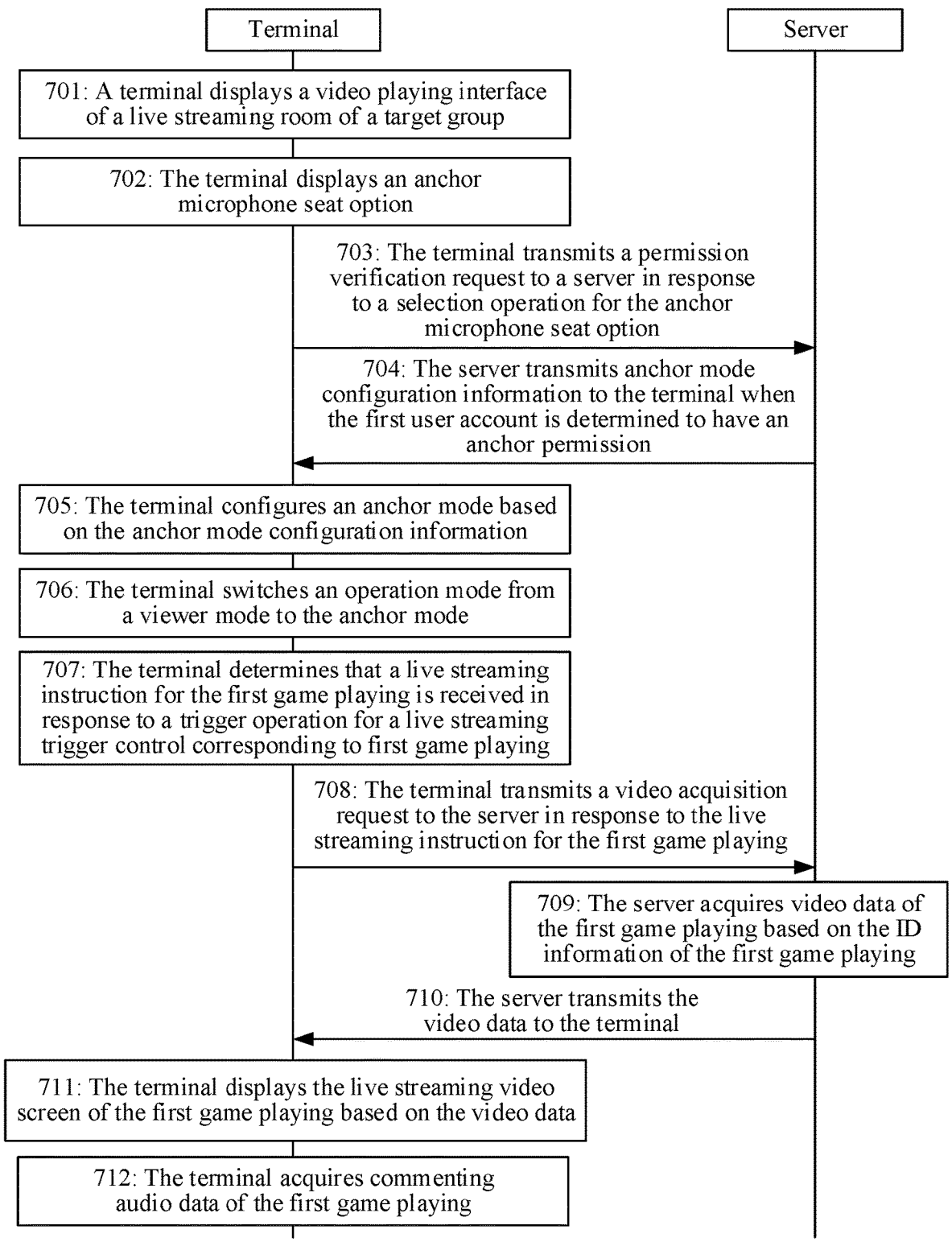
FIG. 7 is a flowchart of a method for live-streaming a video of game playing according to another embodiment of the present disclosure.

FIG. 7 illustrates a flowchart of a method for playing a video signal of multi-user interaction according to another embodiment of the present disclosure. The method can be applied to the system for live-streaming the video of the multi-user interaction activity illustrated in FIG. 1. The method may include the following steps:

In step 701, a terminal displays a video playing interface of a live streaming room of a target group.

In this embodiment of the present disclosure, the video playing interface is used for playing the live streaming video signal of the game playing initiated in the live streaming room.

In step 702, the terminal displays an anchor microphone seat option.

For descriptions of the step 701 to step 702, reference may be made to the foregoing embodiments, and details are not described herein again.

In step 703, in response to a selection operation for the anchor microphone seat option, the terminal transmits a permission verification request to a server.

In this embodiment of the present disclosure, the permission verification request is used for requesting to verify whether a currently logged-in first user account has an anchor permission.

Exemplarily, the terminal transmits the permission verification request to the server through a wired network or a wireless network. In one embodiment, the terminal transmits the permission verification request to a back-end server.

In step 704, when the first user account is determined to have an anchor permission, the server transmits anchor mode configuration information to the terminal.

The anchor mode configuration information refers to information for configuring the anchor mode.

The server receives a permission verification request from the terminal. The permission verification request includes a first user account and an ID of a live streaming room of a target group. The server, based on the first user account and the ID of the live streaming room, determines a verification result. The verification result is used for indicating whether the first user account has an anchor permission. When the verification result indicates that the first user account has the anchor permission, anchor mode configuration information is transmitted to the terminal.

In one embodiment, the server determines the verification result by: based on the ID of the live streaming room, determining an anchor account white list of the live streaming room: and when the anchor account white list includes the first user account, determining that the verification result is used for indicating that the first user account has the anchor permission.

In one embodiment, the server determines the verification result by: based on the ID of the live streaming room, transmitting an approval request to the client logged in by the administrator account corresponding to the live streaming room, where the approval request is used for requesting to approve whether the first user account has the anchor permission: receiving an approval result from the client logged in by the administrator account, where the approval result is used for indicating whether the first user account is approved to have the anchor permission: determining a verification result based on the approval result.

In one embodiment, the anchor permission does not need to be verified, that is, any user can become an anchor by selecting the anchor microphone seat option. In this case, the server can directly transmit the anchor mode configuration information to the terminal without verifying whether the first user account has the anchor permission.

In one embodiment, the permission verification request further carries microphone seat tag information, which is used for indicating the microphone seat type. Exemplarily, the live streaming room includes an anchor microphone seat and an ordinary microphone seat. The anchor microphone seat refers to a microphone seat of an anchor, and the ordinary microphone seat refers to a microphone seat of a commentator who is not an anchor. The anchor has the permission to select which game playing to watch and comment, while the ordinary microphone seat only has the permission to comment the game playing. The server determines whether the first user account has the permission corresponding to the microphone seat type based on the microphone seat tag information. Exemplarily, the process of determining the permission of the ordinary microphone seat is similar to that of determining the permission of the anchor microphone seat.

In one embodiment, when the first user account does not have the anchor permission, the server transmits error information to the terminal, and the error information is used for indicating that the first user account does not have the anchor permission. The terminal displays failure prompt information, which is used for prompting that the first user account does not have the anchor permission and the user cannot become an anchor.

In one embodiment, when the first user account is determined to have the anchor permission, the back-end server transmits anchor mode configuration information to the terminal.

In step 705, the terminal configures the anchor mode based on the anchor mode configuration information.

The terminal receives the anchor mode configuration information from the server. The anchor mode configuration information is transmitted when the first user account has the anchor permission.

In step 706, the terminal switches an operation mode from a viewer mode to an anchor mode.

Figure 8:
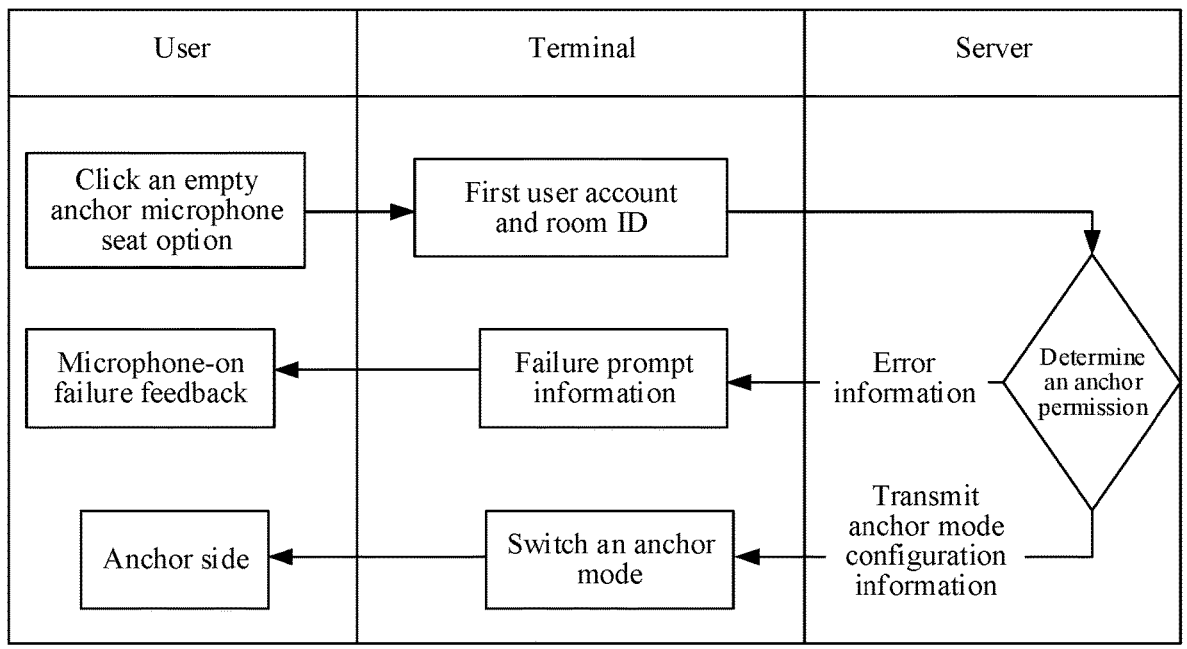
FIG. 8 is a flowchart of anchor mode switching according to an embodiment of the present disclosure.

Exemplarily, referring to FIG. 8, it illustrates a flowchart of anchor mode switching according to an embodiment of the present disclosure. A user clicks an empty anchor microphone seat option. A terminal acquires a first user account (which may be expressed as user ID or UID) and a room ID (which may be expressed as room id). A server (back-end server) determines whether the first user account has an anchor permission. In an example, when the first user account is determined to have the anchor permission, the server transmits anchor mode configuration information to the terminal. The terminal configures an anchor mode based on the anchor mode configuration information, switches an operation mode from a viewer mode to the anchor mode, and the user becomes an anchor. In another example, when it is determined that the first user account does not have the anchor permission, the server transmits error information (which may be an error code) to the terminal, the terminal displays failure prompt information (which may be a failure pop-up window), and the user fails to be on the microphone.

In the anchor mode, the video playing interface includes a display item of at least one game playing. The display item of the game playing includes a live streaming trigger control corresponding to the game playing.

In step 707, in response to a trigger operation for the live streaming trigger control corresponding to first game playing, the terminal determines that a live streaming instruction for the first game playing is received.

For descriptions of the step 707, reference may be made to the embodiments above, and details are not described herein.

In step 708, in response to the live streaming instruction for the first game playing, the terminal transmits a video acquisition request to the server. The video acquisition request is used for requesting to acquire a live streaming video signal of the first game playing.

Correspondingly, the server receives the video acquisition request from the terminal. The video acquisition request includes the ID information of the first game playing. Exemplarily, the ID information of the first game playing is used for identifying the first game playing. In one embodiment, the ID information of the first game playing may be the ID information of the team of the first game playing formed in the live streaming room, for example, the ID information of the team room of the team corresponding to the first game playing (hereinafter referred to as team room ID).

In step 709, the server acquires video data of the first game playing based on the ID information of the first game playing.

In one embodiment, a cloud game server acquires video data of the first game playing based on the ID information of the first game playing. The cloud game server generates video data. The cloud game server reserves a plurality of user accounts (super user accounts) of different zone server types in advance. When the cloud game server receives a video acquisition request from the terminal, it pulls up the cloud game end of the game, automatically logs in the cloud game according to the zone server type provided by the terminal, starts up the OB system self-contained in the cloud game according to the ID information of the first game playing, enters the game from the OB perspective and records the video data.

In one embodiment, the cloud game server requests the OB system from the game server, and transmits the ID information of the first game playing to the game server; the game server acquires a live streaming video signal of the first game playing based on the ID information of the first game playing: the game server transmits the live streaming video signal of the first game playing to the cloud game server: the cloud game server records the live streaming video signal to obtain video data.

In one embodiment, the video acquisition request carries a second user account, which is the game account corresponding to the anchor. The cloud game server can determine whether the second user account meets the game watching condition. When the second user account meets the game watching condition, the cloud game server logs in to the cloud game through the second user account: when the second user account does not meet the game watching condition, the cloud game server logs in to the cloud game through the super user account. In this case, the cloud game server can flexibly select an account to log in to the cloud game. On the one hand, it will not affect the watching of the game. On the other hand, there is no restriction on the number of anchors online at the same time.

In one embodiment, the cloud game server logs in to the cloud game through a super user account. In this case, large-scale super user accounts are required, which will restrict the number of anchors online at the same time.

In one embodiment, the cloud game server logs in to the cloud game through a second user account. When the level of the second user account and/or the zone server do not meet the condition, it will affect the watching of the game, but this situation will not restrict the number of anchors online at the same time.

In step 710, the server transmits the video data to the terminal.

Correspondingly, the terminal receives the video data from the server. The video data includes the live streaming video signal of the first game playing.

In one embodiment, the cloud game server pushes the recorded video data to the back-end server in real time, and the back-end server generates a video link of the first game playing by transcoding the video stream, and transmits the video link to the terminal.

Exemplarily, the server receives a video acquisition request from a client (live streaming client), and the server acquires video data of the first game playing based on the ID information of the first game playing; the server transmits the video data to the client (live streaming client).

In step 711, the terminal displays the live streaming video signal of the first game playing based on the video data.

In this embodiment of the present disclosure, the live streaming video signal of the first game playing is pushed to a client logged in by at least one user account in the live streaming room for displaying. Exemplarily, the user accounts in the room have the same room ID. The server transmits the video data to the terminals having the same room ID. Exemplarily, the back-end server transmits the video data to the terminals having the same room ID.

A browser embedded in the watching area of the live streaming room automatically opens the video link and automatically plays it, so as to realize real-time game watching.

Figure 9:
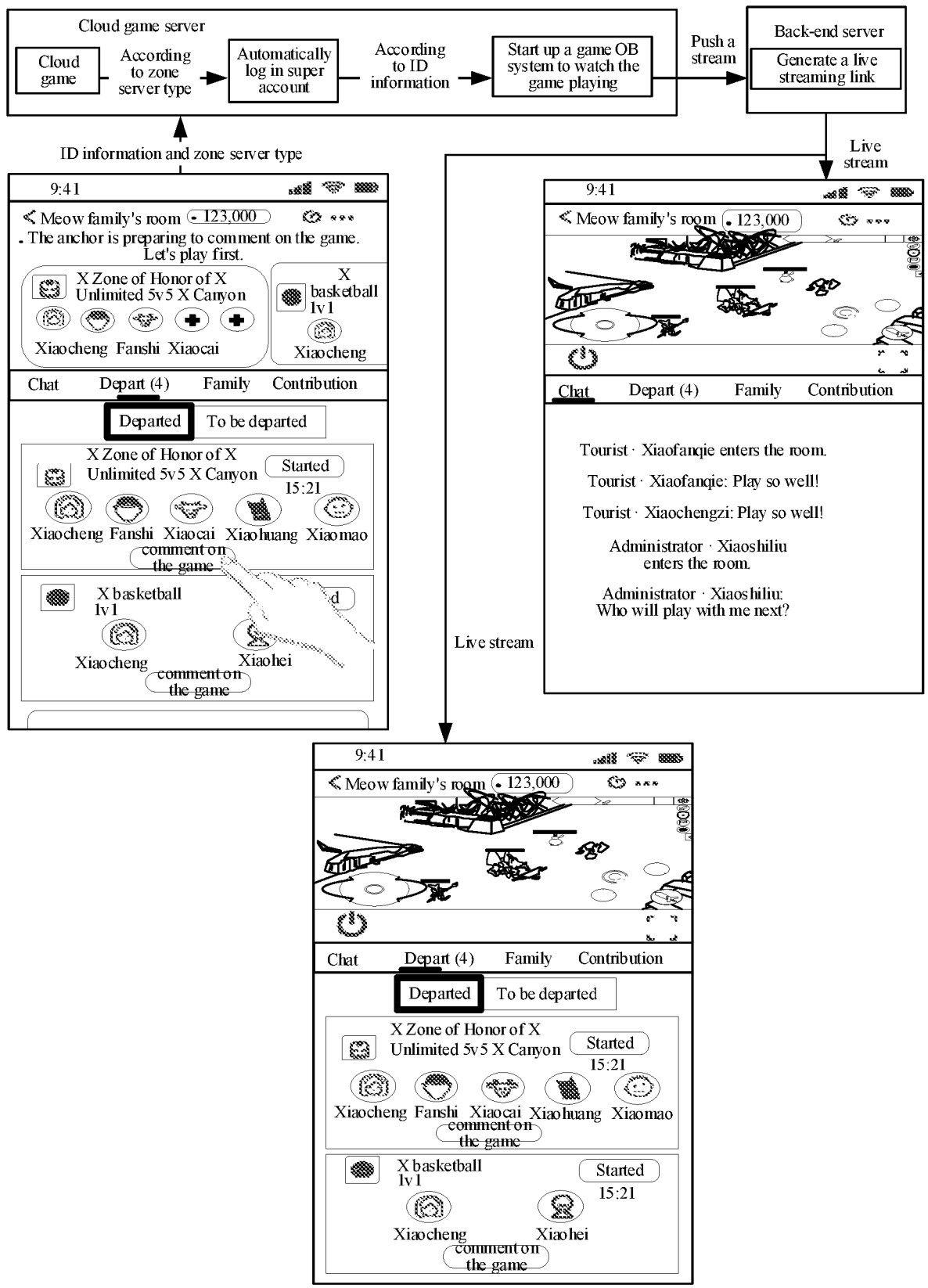
FIG. 9 is a flowchart of live streaming according to an embodiment of the present disclosure.

Referring to FIG. 9, it illustrates a flowchart of live streaming according to an embodiment of the present disclosure. The anchor clicks the live streaming trigger control, the terminal receives the live streaming instruction for the first game playing, and the terminal transmits the video acquisition request to the cloud game server. The video acquisition request carries the ID information of the first game playing and the zone server type. The cloud game server automatically logs in the game account based on the zone server type, and starts up the OB system to acquire the video data of the first game playing based on the ID information of the first game playing. The cloud game server pushes the stream to the back-end server. The back-end server generates a live streaming link and pushes the live stream to the client logged in by at least one user account in the live streaming room for displaying.

It is to be understood that, when the game client does not distinguish the zone server type, the terminal only needs to transmit the ID information of the first game playing to the server, and does not need to transmit the zone server type.

In step 712, the terminal acquires commenting audio data of the first game playing.

The commenting audio data of the first game playing and the live streaming video signal of the first game playing are synchronously pushed to a client logged in by at least one user account in the live streaming room for playing.

Exemplarily, the terminal will only acquire audio data of the anchor microphone seat and the ordinary microphone seat.

In this way, according to the live streaming instruction of the anchor for the first multi-user interaction activity, the live streaming video signal of the first multi-user interaction activity is requested from the server, and the commenting audio data of the first multi-user interaction activity is acquired at the same time, thus not only realizing the multi-user real-time game watching, but also making other users hear the commenting audio corresponding to the live streaming video signal in real time, facilitating more interactive behaviors among the multi-users, and improving the running efficiency of the terminal.

Figure 10:
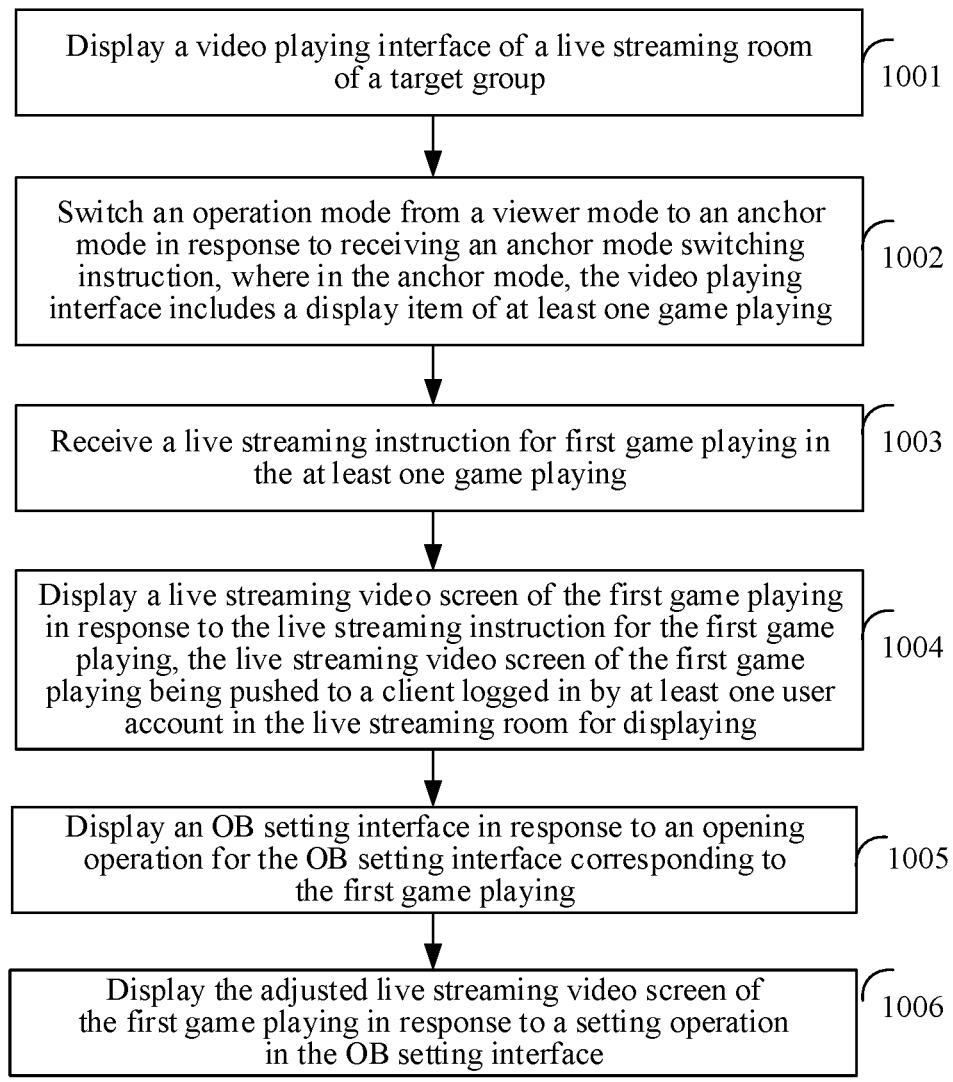
FIG. 10 is a flowchart of a method for live-streaming a video of game playing according to another embodiment of the present disclosure.

FIG. 10 illustrates a flowchart of a method for live-streaming a video of game playing according to another embodiment of the present disclosure. The method can be applied to the terminal illustrated in FIG. 1. The method may include the following steps:

In step 1001, a video playing interface of a live streaming room of a target group is displayed.

In this embodiment of the present disclosure, the video playing interface is used for playing the live streaming video signal of the game playing initiated in the live streaming room.

In step 1002, in response to receiving an anchor mode switching instruction, an operation mode is switched from a viewer mode to an anchor mode. In the anchor mode, the video playing interface includes a display item of at least one game playing.

In step 1003, a live streaming instruction for first game playing in the at least one game playing is received.

In step 1004, in response to the live streaming instruction for the first game playing, a live streaming video signal of the first game playing is displayed. The live streaming video signal of the first game playing is pushed to a client logged in by at least one user account in the live streaming room for displaying.

For descriptions of the step 1001 to step 1004, reference may be made to the foregoing embodiments, and details are not described herein again.

In step 1005, in response to an opening operation for an OB setting interface corresponding to the first game playing, the OB setting interface is displayed.

OB (observer) refers to a user who does not directly participate in the game but enters the game as an observer. The OB perspective refers to the perspective of the referee, from which the referee usually performs notarization.

The OB setting interface refers to an interface for setting the OB perspective of watching game playing of others. The OB setting interface includes a brief mode setting entry and a full mode setting entry. In the full mode, the anchor can view the skills, cooling state, cooling time and the like of each virtual object through the virtual object list on two sides of the OB setting interface.

In one embodiment, the terminal receives the opening operation for the OB setting interface corresponding to the first game playing, and transmits an OB setting interface acquisition request to the cloud game server. The OB setting interface acquisition request is used for requesting to acquire the OB setting interface. The cloud game server transmits the OB setting interface to the terminal. The terminal displays the OB setting interface.

Figure 11:
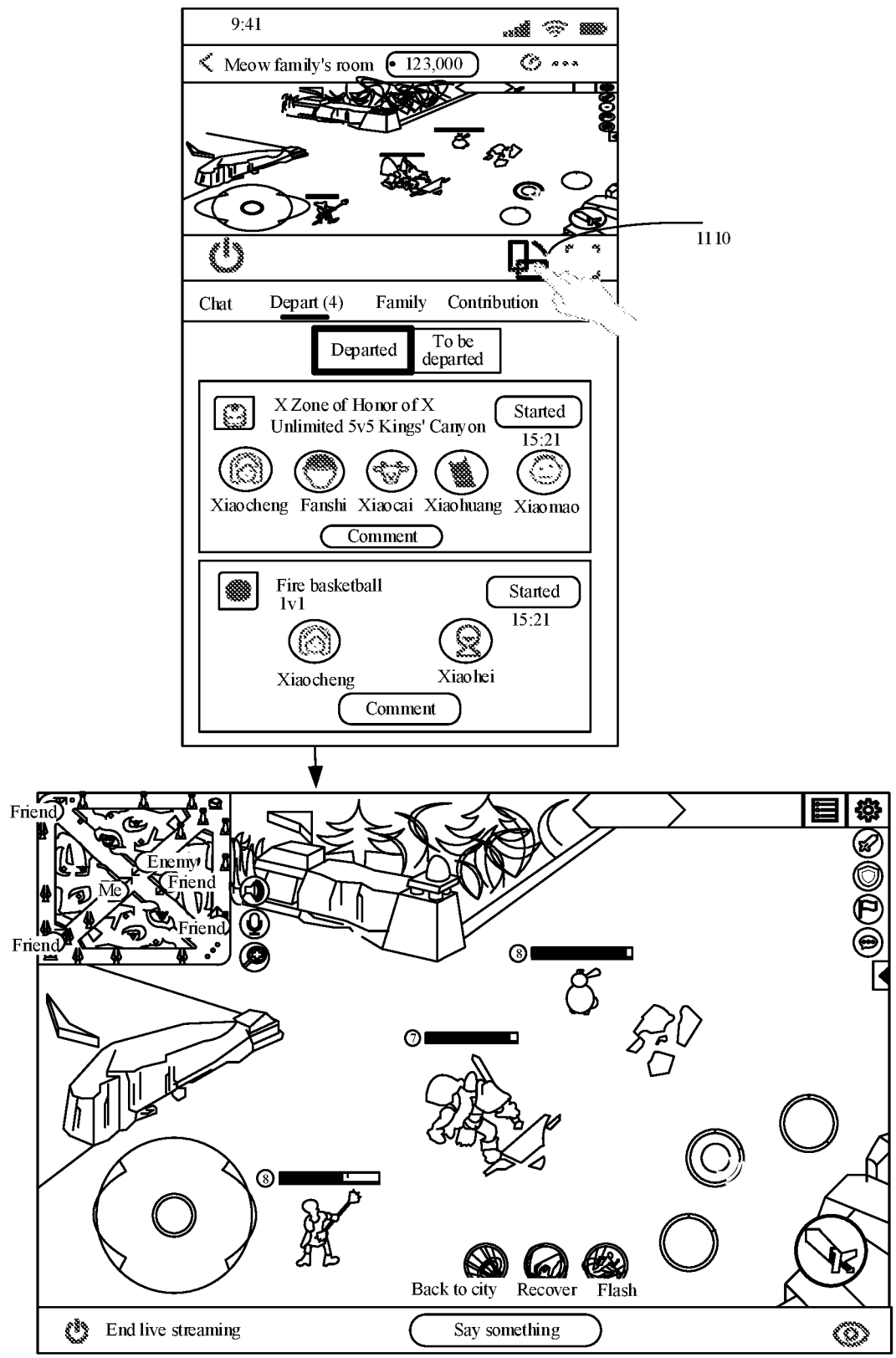
FIG. 11 is a schematic diagram of a live streaming video screen according to an embodiment of the present disclosure.
Figure 12:
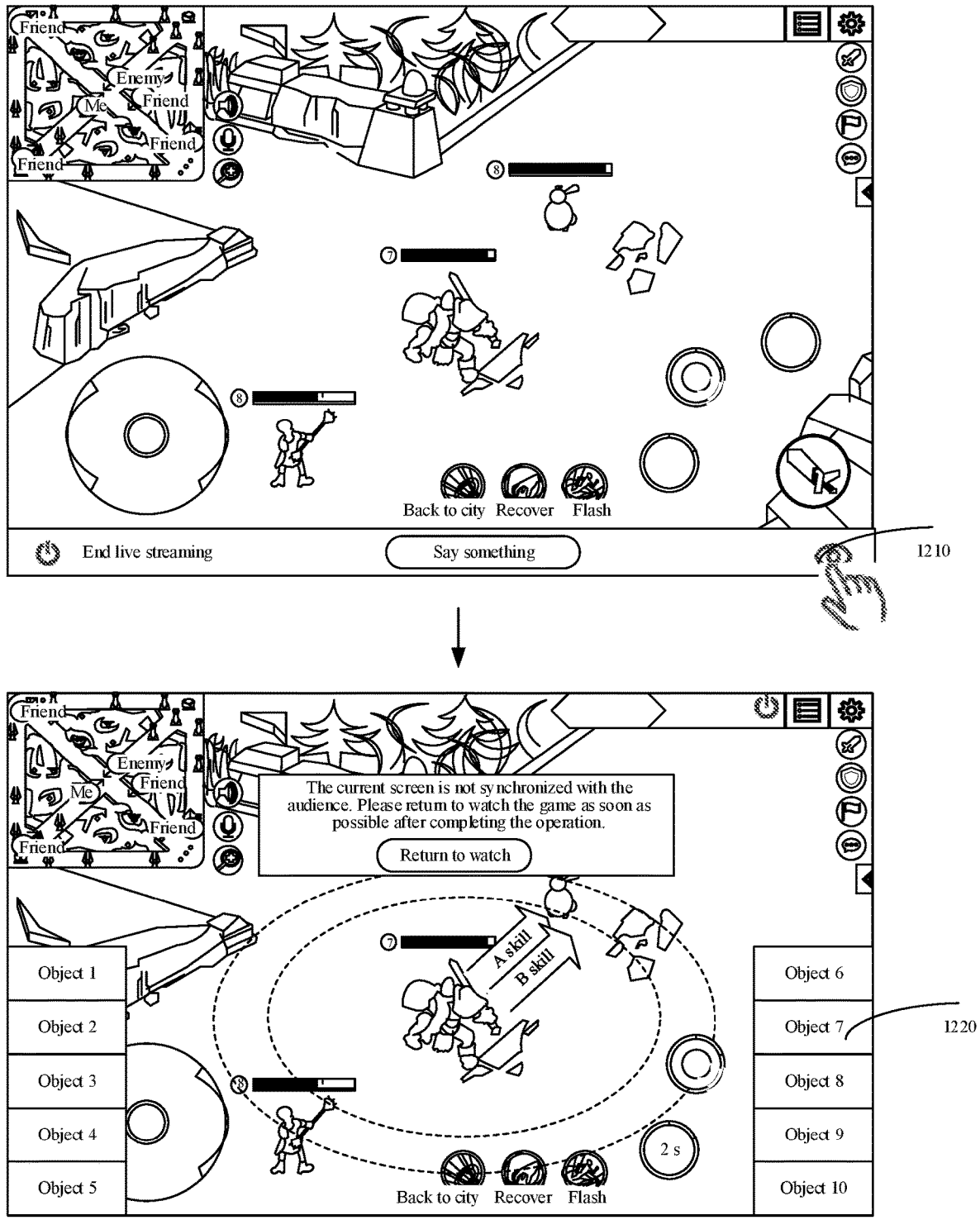
FIG. 12 is a schematic diagram of an OB setting interface according to an embodiment of the present disclosure.

In one embodiment, when the live streaming video signal of the first game playing is in a horizontal screen playing state, an OB setting interface opening option is displayed: in response to receiving a trigger operation for the OB setting interface opening option, it is determined that the opening operation for the OB setting interface is received, and the OB setting interface is displayed. Referring to FIG. 11, the video live streaming interface includes a horizontal screen watching option 1110. The user touches the horizontal screen watching option 1110, and the terminal displays the live streaming video screen of the first game playing on the horizontal screen. Referring to FIG. 12, when the live streaming video screen of the first game playing is in the horizontal screen playing state, the video live streaming interface includes an OB setting interface opening option 1210. The user clicks the OB setting interface opening option 1210, and the terminal displays the OB setting interface 1220.

In step 1006, in response to a setting operation in the OB setting interface, the adjusted live streaming video signal of the first game playing is displayed.

In one embodiment, step 1006 includes the following sub-steps:
1. In response to the setting operation in the OB setting interface, setting information is transmitted to a server. The setting information is used for indicating the setting operation.
2. Adjusted video data from the server is received. The adjusted video data includes the adjusted live streaming video signal of the first game playing. The adjusted live streaming video signal of the first game playing refers to the screen adjusted based on the setting information.
3. The adjusted live streaming video signal of the first game playing is displayed.

Exemplarily, the terminal transmits setting information to the cloud game server: the cloud game server transmits the adjusted video data to the terminal based on the setting information: the terminal displays the adjusted live streaming video signal.

The adjusted live streaming video signal of the first game playing is pushed in real time to a client logged in by at least one user account in the live streaming room.

The live streaming ability of the live streaming room is realized based on the multi-user interaction cloud server and the multi-user interaction OB system. When the anchor opens the OB setting interface, the terminal requests the multi-user interaction cloud server to transmit a cloud link (multi-user interaction cloud link), and the terminal displays the cloud multi-user interaction activity page, thus realizing the direct operation by the anchor to the OB system in the cloud multi-user interaction activity, making the adjusted live streaming video signal take effect in real time, and allowing the audience to see the adjusted live streaming video signal at the same time. In this way, it avoids the frequent switching between the multi-user interaction activity client and the live streaming platform in the process that the anchor comments the live streaming video signal, thus saving the network resources and the hardware resources, and reducing the user operation costs.

Figure 13:
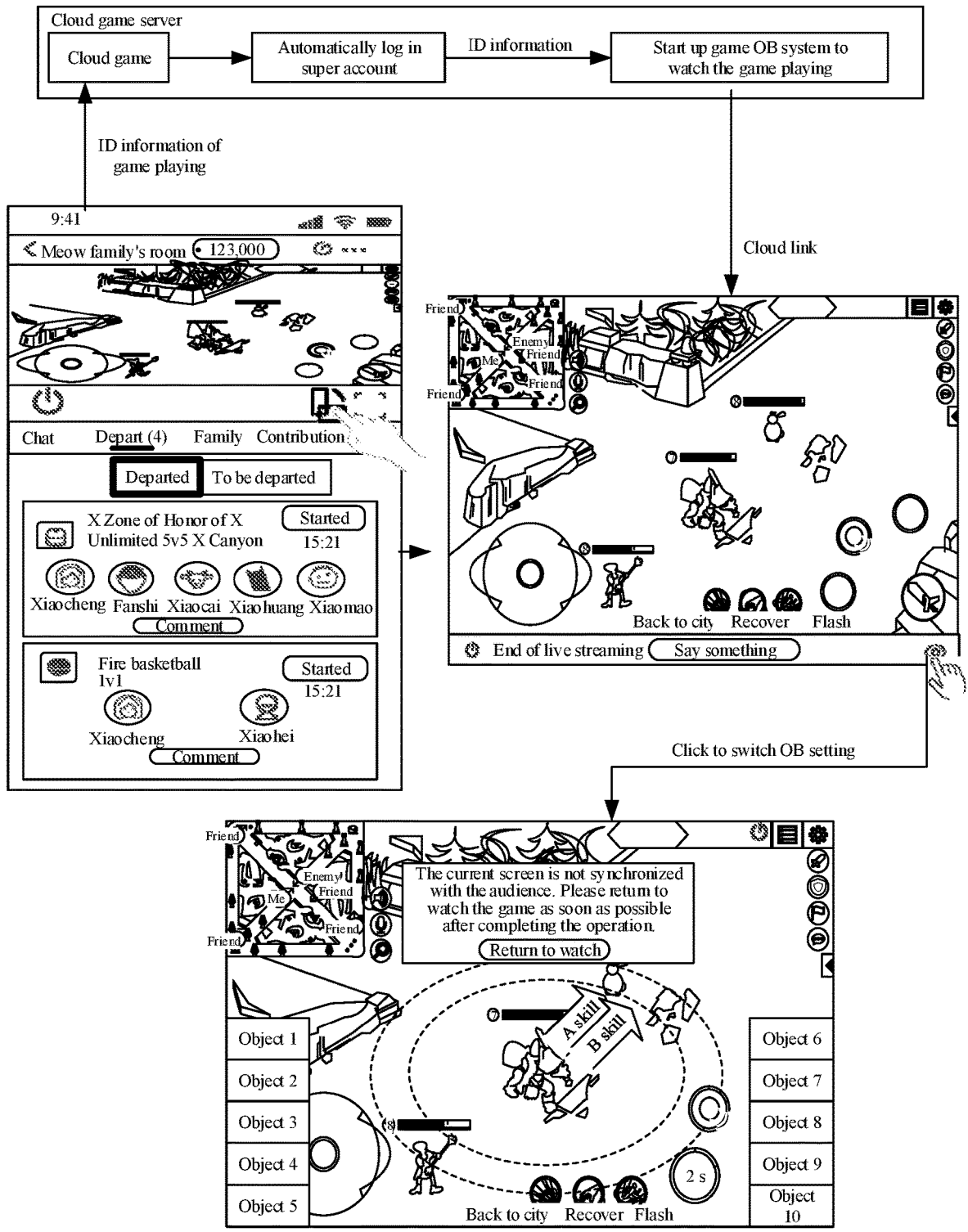
FIG. 13 is a flowchart of OB setting according to an embodiment of the present disclosure.

FIG. 13 illustrates a flowchart of OB setting according to an embodiment of the present disclosure. The terminal transmits the setting information to the cloud game server. The cloud game server automatically logs in the super account, starts up the OB system to watch the first game playing based on the ID information of the first game playing. The cloud game server transmits the cloud link to the terminal. The terminal displays the adjusted live streaming video signal of the first game playing.

Figure 14:
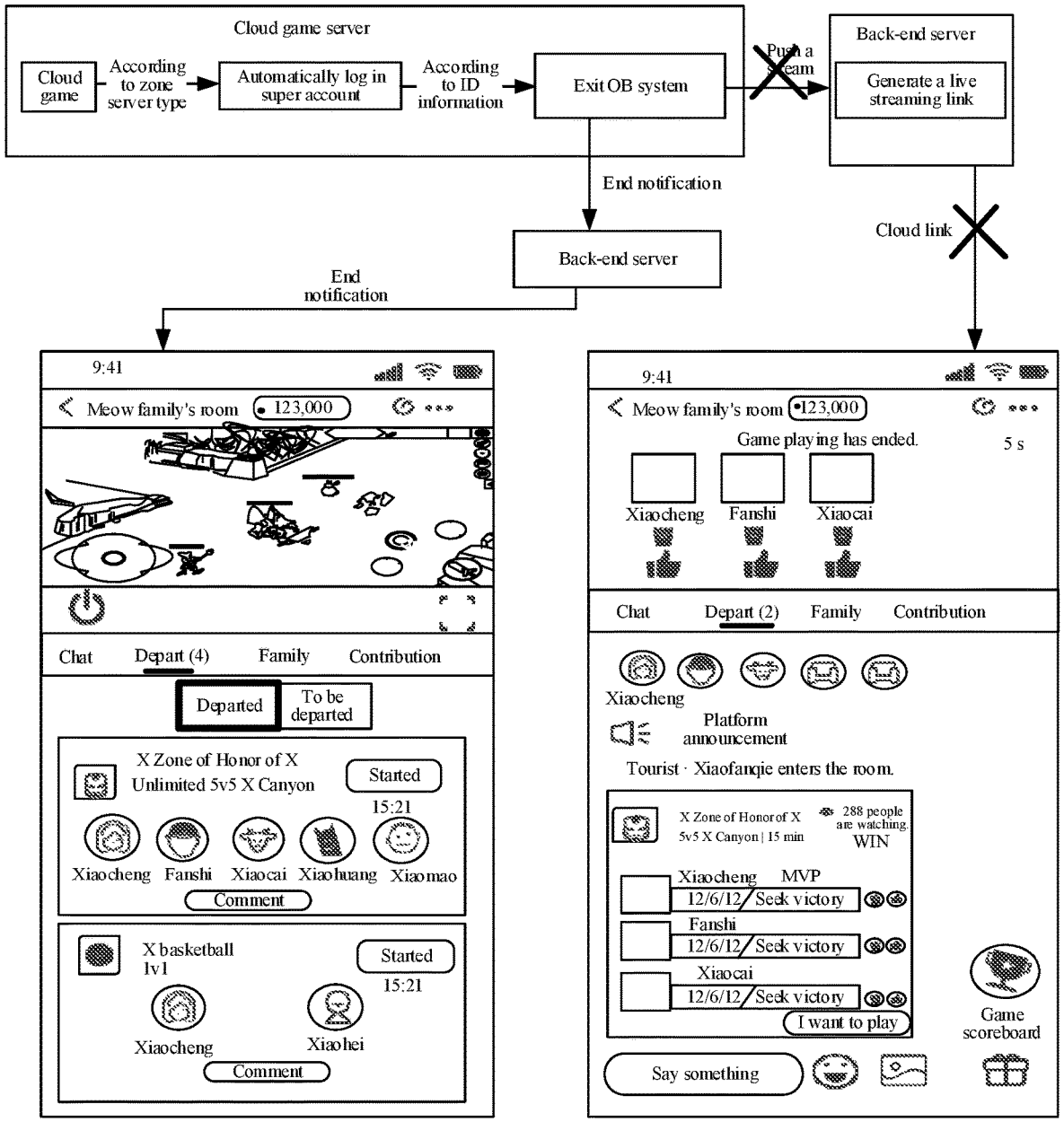
FIG. 14 is a flowchart of live streaming ending according to an embodiment of the present disclosure.

In one embodiment, referring to FIG. 14, the cloud game server transmits an end notification to the back-end server. The end notification is used for indicating that the first game playing has ended. The back-end server transmits the end notification to the terminal. The cloud game server exits the OB system. The cloud game server stops pushing the stream to the back-end server. The back-end server stops transmitting the cloud link to the terminal. The terminal displays game end prompt information, which is used for prompting that the first game playing has ended.

In one embodiment, the terminal transmits an OB system exiting request to the cloud game server. The OB system exit request is used for requesting to exit the OB system. The cloud game server exits the OB system. The terminal displays live streaming end prompt information. The live streaming end prompt information is used for prompting that the live streaming has ended.

When the game playing ends or the OB system triggers an end operation, the cloud game server interrupts the process of pushing the stream to the back-end server. At the same time, the cloud game server returns a game playing watching end field to the back-end server. The back-end server notifies the terminal of the end of live streaming. The terminal displays live streaming end prompt information. The live streaming room recovers to the state when there is no live streaming.

Figure 15:
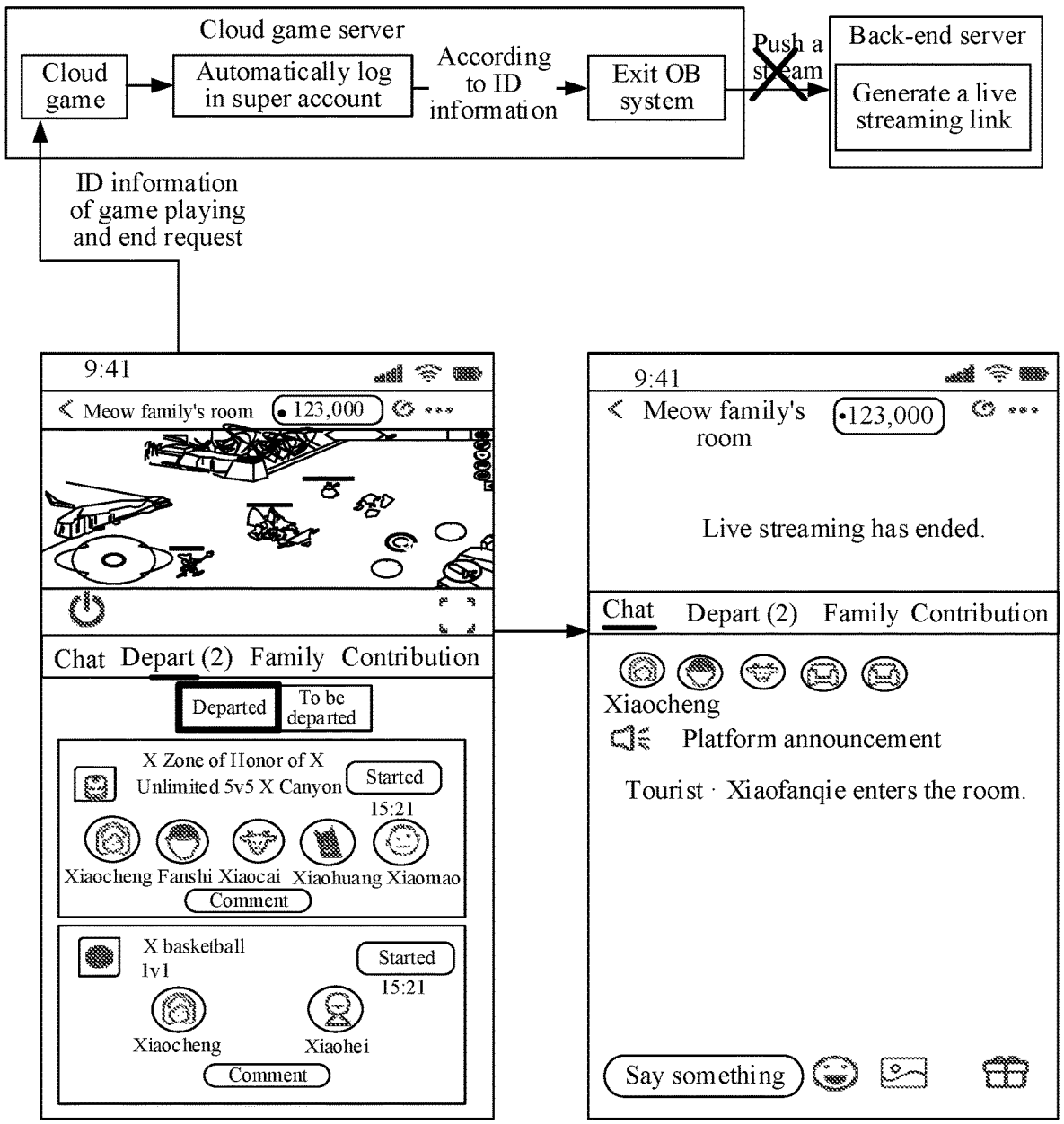
FIG. 15 is a flowchart of live streaming ending according to another embodiment of the present disclosure.
Figure 16:
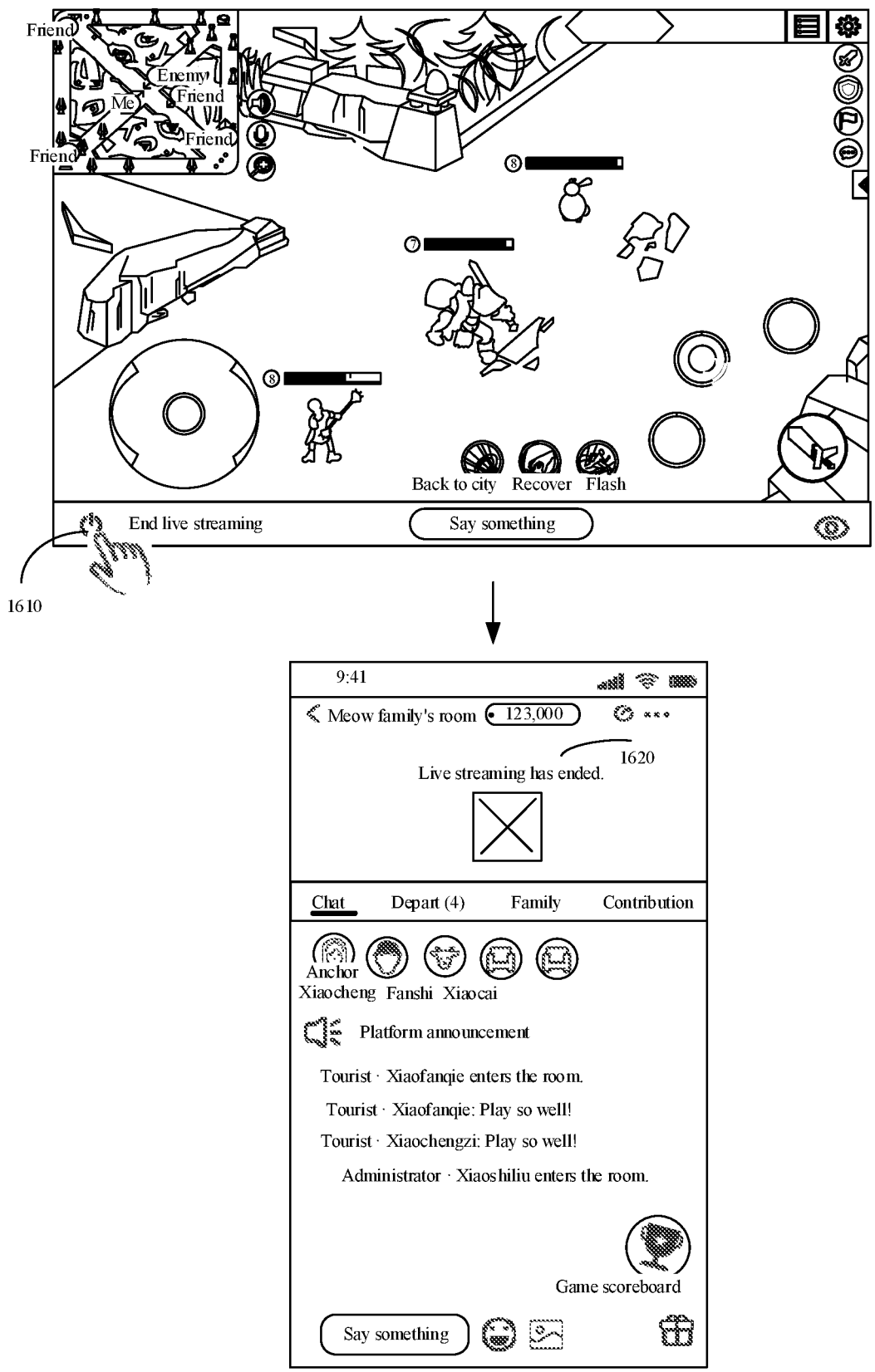
FIG. 16 is a schematic diagram of live streaming end prompt information according to an embodiment of the present disclosure.

Referring to FIG. 15, the terminal transmits an end request to the cloud game server. The end request is used for requesting to stop pushing the stream. The end request includes ID information of the first game playing. The cloud game server exits the OB system. The terminal displays live streaming end prompt information. Referring to FIG. 16, the anchor actively clicks a live streaming end option 1610 in the live streaming room in the process of watching the game playing. The terminal directly stops the live streaming, displays live streaming end prompt information 1620, and requests the cloud game server to exit the OB system to stop pushing the stream.

Figure 17:
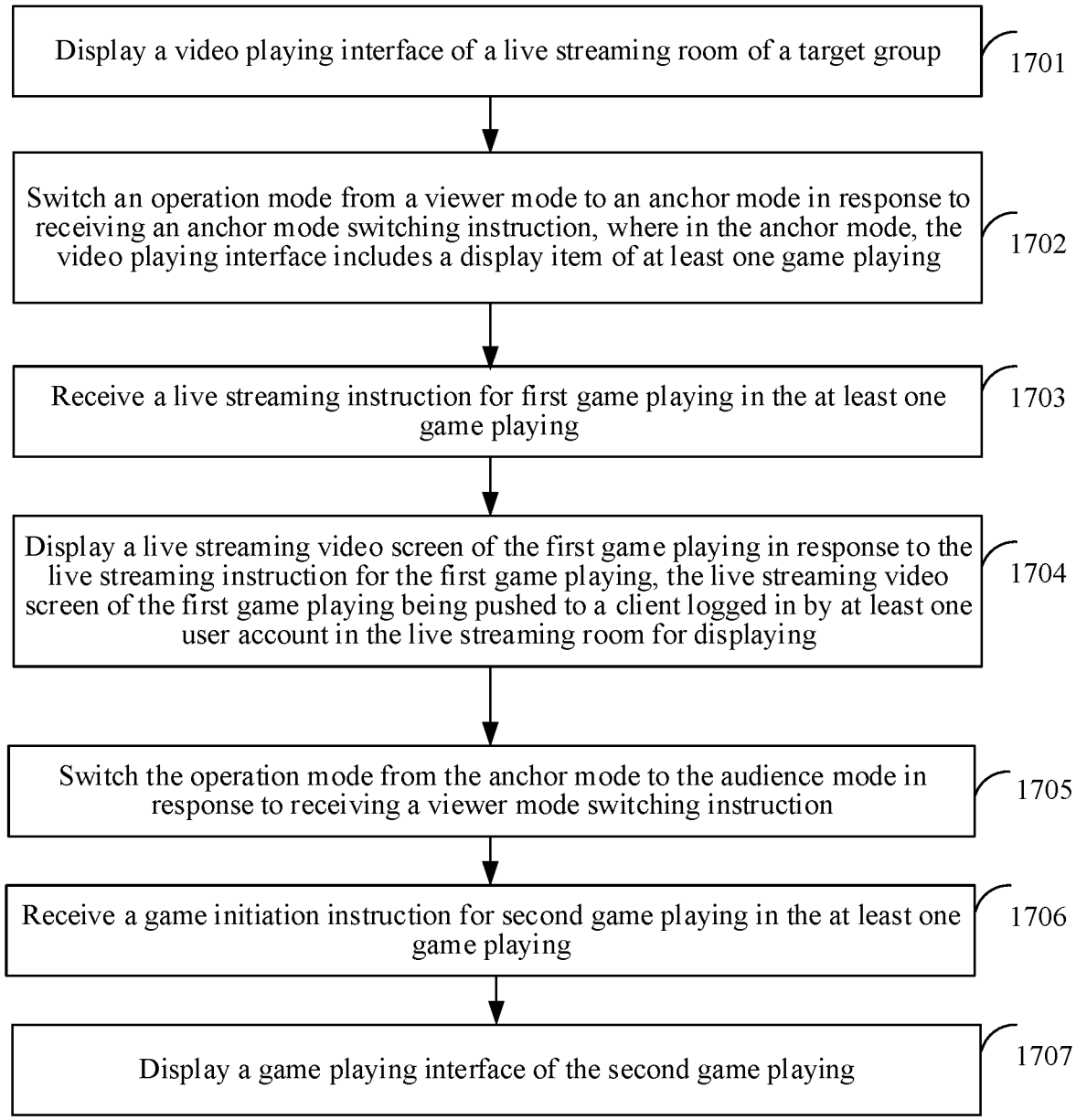
FIG. 17 is a flowchart of a method for live-streaming a video of game playing according to another embodiment of the present disclosure.

FIG. 17 illustrates a flowchart of a method for live-streaming a video of game playing according to another embodiment of the present disclosure. The method can be applied to the terminal illustrated in FIG. 1. The method may include the following steps:

In step 1701, a video playing interface of a live streaming room of a target group is displayed. The video playing interface is used for playing a live streaming video signal of game playing initiated in the live streaming room.

In step 1702, in response to receiving an anchor mode switching instruction, an operation mode is switched from a viewer mode to an anchor mode. In the anchor mode, the video playing interface includes a display item of at least one game playing.

In step 1703, a live streaming instruction for first game playing in the at least one game playing is received.

In step 1704, in response to the live streaming instruction for the first game playing, a live streaming video signal of the first game playing is displayed. The live streaming video signal of the first game playing is pushed to a client logged in by at least one user account in the live streaming room for displaying.

For descriptions of the step 1701 to step 1704, reference may be made to the foregoing embodiments, and details are not described herein again.

In step 1705, in response to receiving a viewer mode switching instruction, the operation mode is switched from the anchor mode to the viewer mode.

Figure 18:
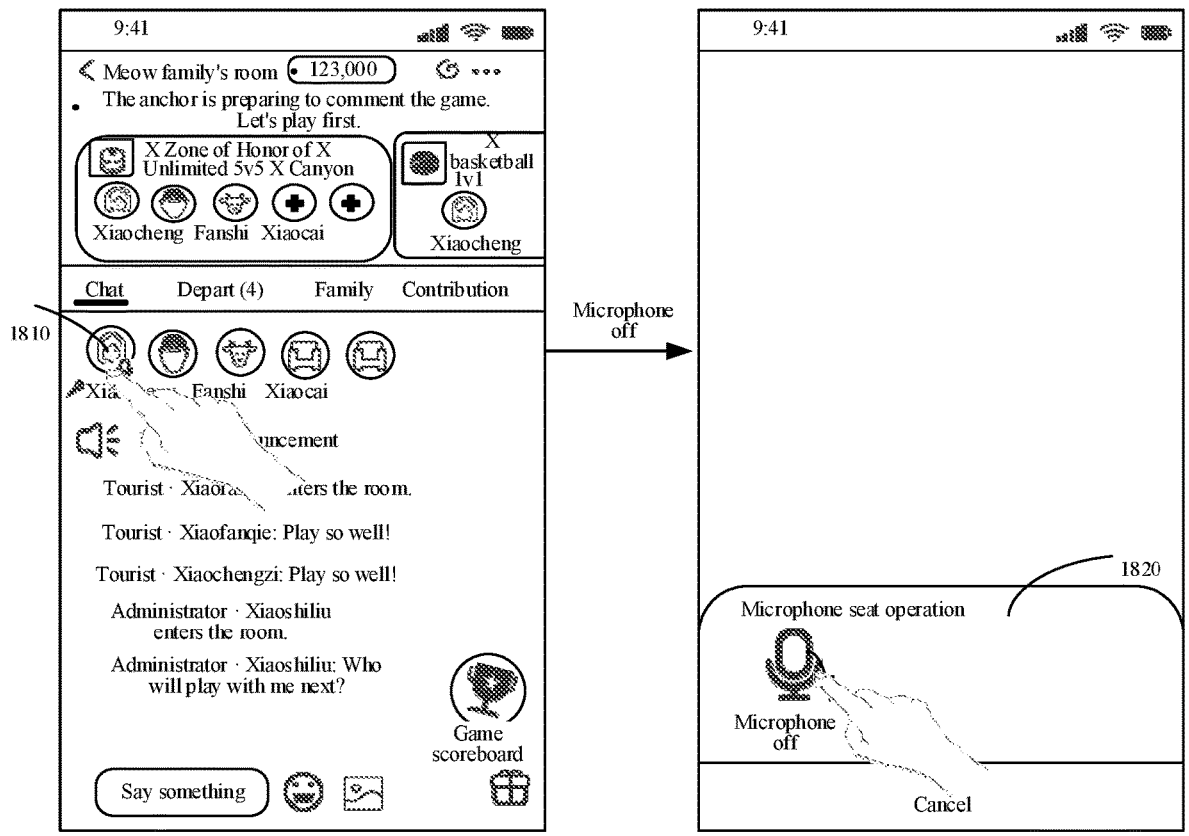
FIG. 18 is a schematic diagram of a microphone off interface according to an embodiment of the present disclosure.

In one embodiment, an anchor microphone-off option is displayed. In response to receiving a trigger instruction for the anchor microphone-off option, it is determined that a viewer mode switching instruction is received. The operation mode is switched from the anchor mode to the viewer mode. The anchor microphone-off option refers to the option for switching the operation mode from the anchor mode to the viewer mode. Referring to FIG. 18, the terminal displays an anchor microphone-off option 1810. The user clicks the anchor microphone-off option 1810 to display a microphone-off interface 1820. The microphone-off interface includes a microphone-off entry and a cancellation entry. When the terminal receives a selection instruction for the microphone-off entry, the operation mode is switched from the anchor mode to the viewer mode. When the terminal receives a selection instruction for the cancellation entry, the operation mode is still the anchor mode.

In this way, the anchor can flexibly switch between the anchor mode and the viewer mode, and users can avoid downloading an additional live streaming application program, thus saving the network resources and reducing the operation costs.

In step 1706, a game initiation instruction for second game playing in the at least one game playing is received.

The second game playing may be any game playing.

In one embodiment, a display item of the at least one game playing includes a game initiation option. In response to receiving a trigger instruction for the game initiation option included in the display item of the second game playing, it is determined that a game initiation instruction for the second game playing is received.

In one embodiment, the game initiation instruction is triggered by the user who creates the display item of the second game playing.

In one embodiment, in response to meeting a game start condition, the terminal actively starts the game.

In step 1707, a game playing interface of the second game playing is displayed.

Figure 19:
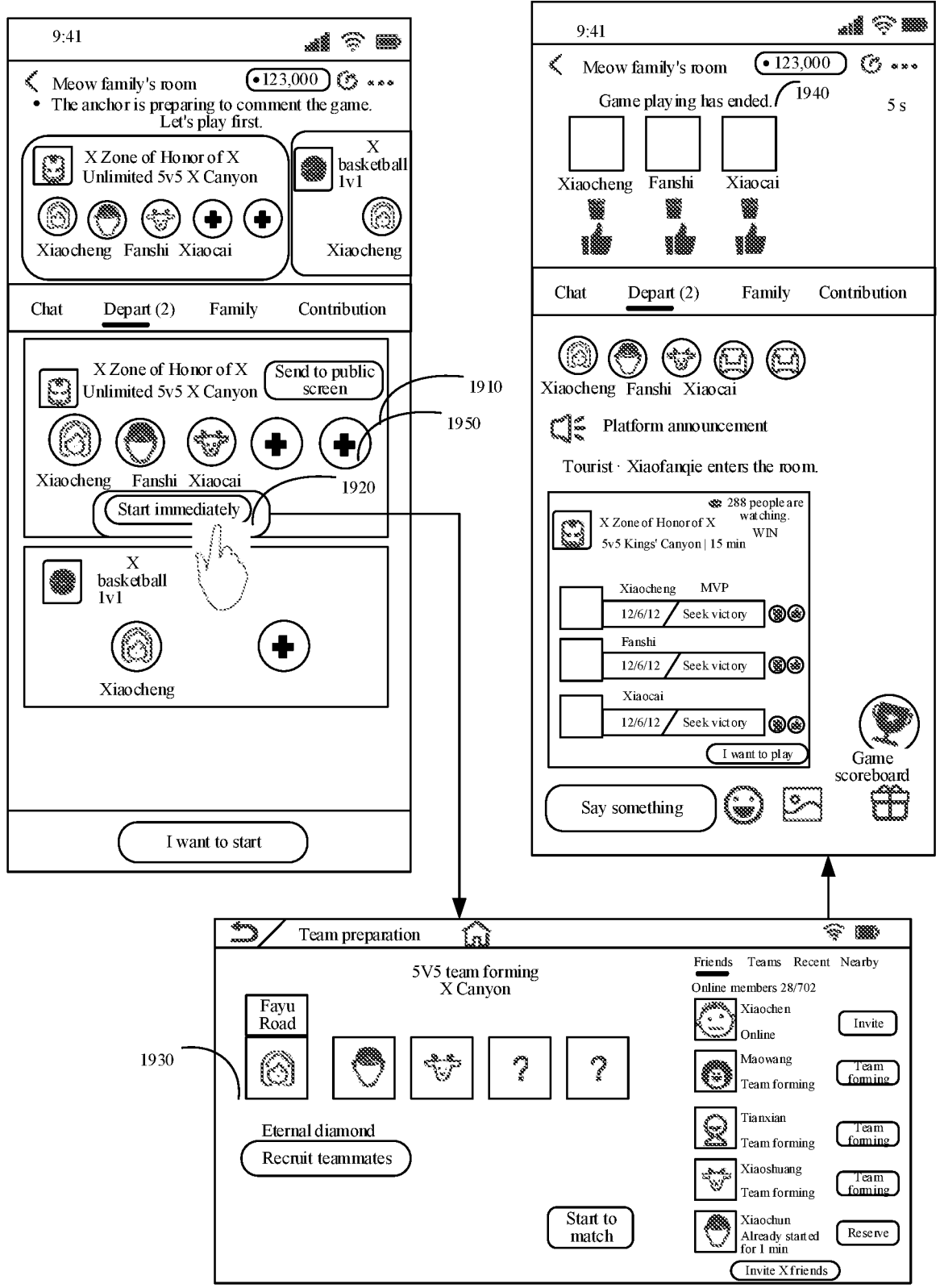
FIG. 19 is a flowchart of game initiation according to an embodiment of the present disclosure.

In one embodiment, referring to FIG. 19, the display item 1910 of the game playing includes a game initiation option 1920. The user clicks the game initiation option 1920. The terminal displays a game playing interface 1930. After the game playing has ended, the terminal displays game playing end prompt information 1940. The game playing end prompt information is used for prompting that the game playing has ended.

In one embodiment, after the game playing has ended, the terminal automatically jumps back from the game client to the live streaming client. The page corresponding to the "chat" tab displays the game result and the user's record of the game playing. The game result is used for indicating whether the user fails or succeeds in the game playing. The user's record is used for indicating the user's performance in the game playing.

For example, on the "depart" page in the live streaming room, the terminal displays a game playing list to the audience. The game playing list provides the ability to create and join game playing.

The display item of the game playing may be in the form of card. The "depart" page displays the card that a team is being formed to play a game together in the live streaming room in the form of list. There are seats for the team members on the card. The user accounts of the users who are already in the team are displayed on the card. The name of the card may be the name of the game. Of course, in some other embodiments, the name of the card may also be the user account of the user who creates the card, which is not limited in this embodiment of the present disclosure. The user can join the game corresponding to the card by clicking on the empty seat on the card. Referring to FIG. 19, the user can join the game corresponding to the card by clicking on the empty seat 1950 on the card named "X Zone of Honor of X".

In one embodiment, the back-end server needs to verify whether the user meets a team forming condition. When the user does not meet the team forming condition, the joining fails. The terminal may display failure prompt information. The display failure prompt information is used for prompting the user that the user does not meet the team forming condition. Exemplarily, description will be made by taking that the game corresponding to the card is as Honor of X an example. When the rank of the user and the zone server do not meet the team forming condition, the user fails to join.

Figure 20:
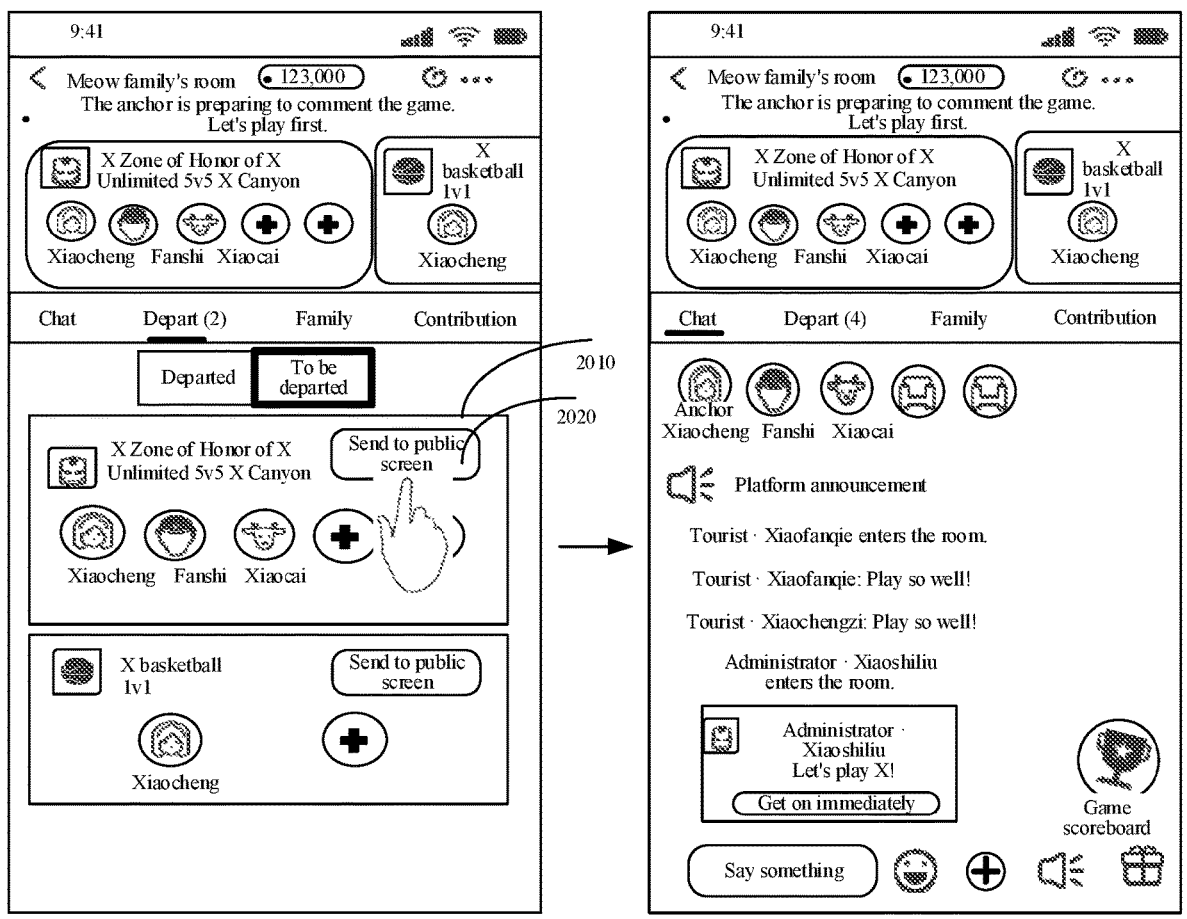
FIG. 20 is a schematic diagram of sharing of a display item of game playing according to an embodiment of the present disclosure.

In one embodiment, the display item of the game playing can be shared, so that more people can see the display item of the game playing and join the game playing. Referring to FIG. 20, a display item 2010 of the game playing includes a sharing option 2020. The user clicks the sharing option 2020 to share the display item of the game playing to the chat session.

In one embodiment, description will be made by taking that the ID information of first game playing is the ID information of the team room of the team corresponding to the first game playing (hereinafter referred to as team room ID). The terminal transmits a game start request to the back-end server. The game start request includes ID information of a display item of third game playing. The back-end server transmits a team room ID acquisition request to the game server. The team room ID acquisition request is used for requesting to acquire a team room ID. The game server generates a team room ID. The game server transmits the team room ID to the back-end server. The back-end server stores the team room ID and the ID information of the display item of the third game playing correspondingly. The back-end server transmits the team room ID to the terminal. The live streaming client in the terminal pulls up the game client: The game client creates a team room based on the team room ID. The user starts the game in the game client. The game client transmits a game playing request to the game server. The game server generates a game playing ID. The game server transmits the game playing ID to the game client. The game client enters the game playing based on the game playing ID. After the game playing has ended, the game server will transmit game playing status information to the back-end server, and the back-end server will transmit the game playing status information to the live streaming client.

It is to be understood that, both the audience and the anchor can initiate the game and enter the game.

It is to be understood that, the execution sequence in this embodiment of the present disclosure is only exemplary. In one embodiment, step 1706 may be executed after the anchor comments the first game playing, or may be executed before the anchor comments the first game playing. That is, the user may play the game first and then comment the game playing. The user may also comment the game playing first and then play the game, which is not limited in this embodiment of the present disclosure.

Figure 21:
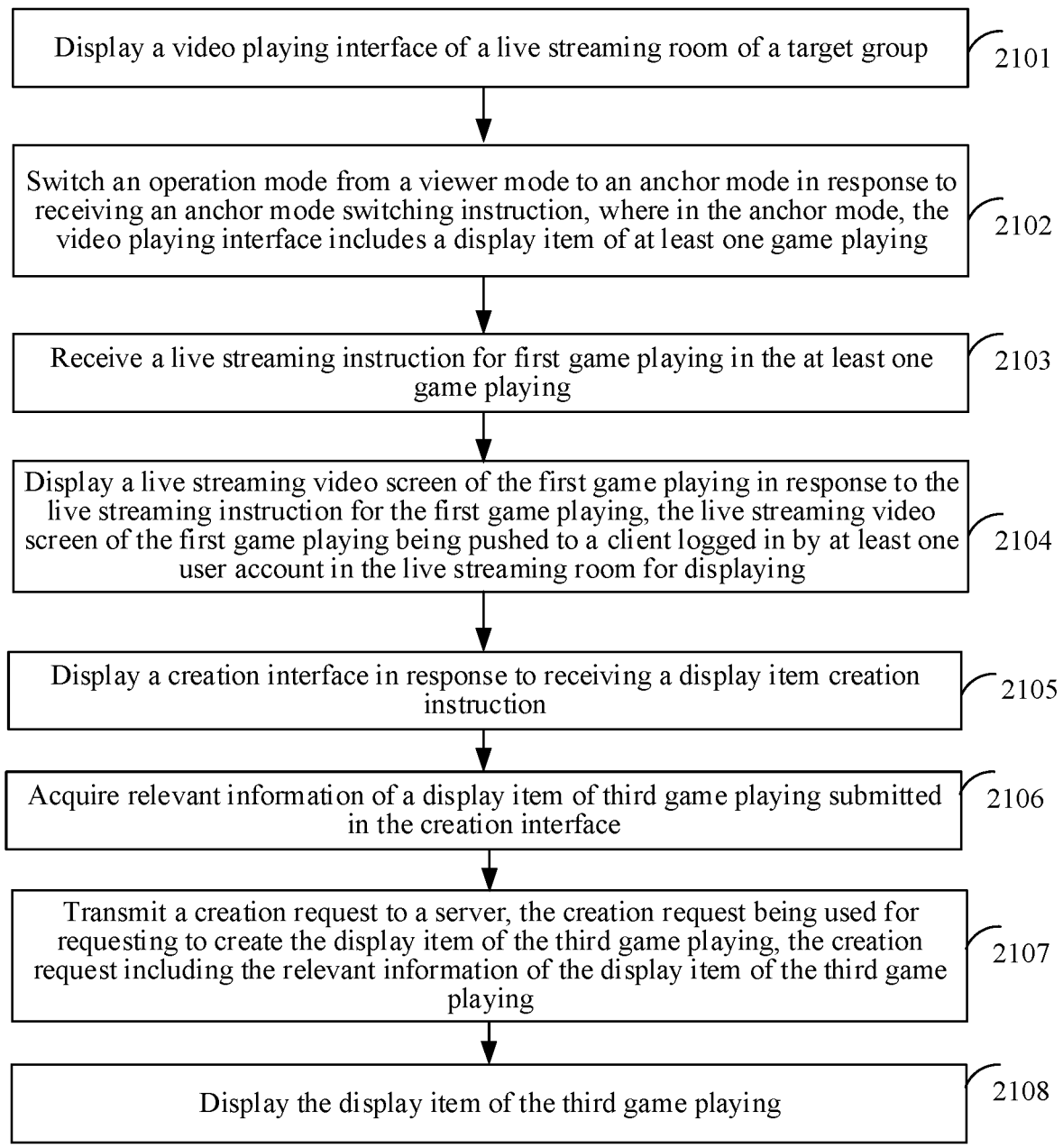
FIG. 21 is a flowchart of a method for live-streaming a video of game playing according to another embodiment of the present disclosure.

FIG. 21 illustrates a flowchart of a method for live-streaming a video of game playing according to another embodiment of the present disclosure. The method can be applied to the terminal illustrated in FIG. 1. The method may include the following steps:

In step 2101, a video playing interface of a live streaming room of a target group is displayed. The video playing interface is used for playing a live streaming video signal of game playing initiated in the live streaming room.

In step 2102, in response to receiving an anchor mode switching instruction, an operation mode is switched from a viewer mode to an anchor mode. In the anchor mode, the video playing interface includes a display item of at least one game playing.

In step 2103, a live streaming instruction for first game playing in the at least one game playing is received.

In step 2104, in response to the live streaming instruction for the first game playing, a live streaming video signal of the first game playing is displayed. The live streaming video signal of the first game playing is pushed to a client logged in by at least one user account in the live streaming room for displaying.

For descriptions of the step 2101 and step 2104, reference may be made to the foregoing embodiments, and details are not described herein again.

In step 2105, in response to receiving a display item creation instruction, a creation interface is displayed.

The display item creation instruction refers to an instruction for creating a display item of game playing. The creation interface refers to an interface for creating a display item.

Figure 22:
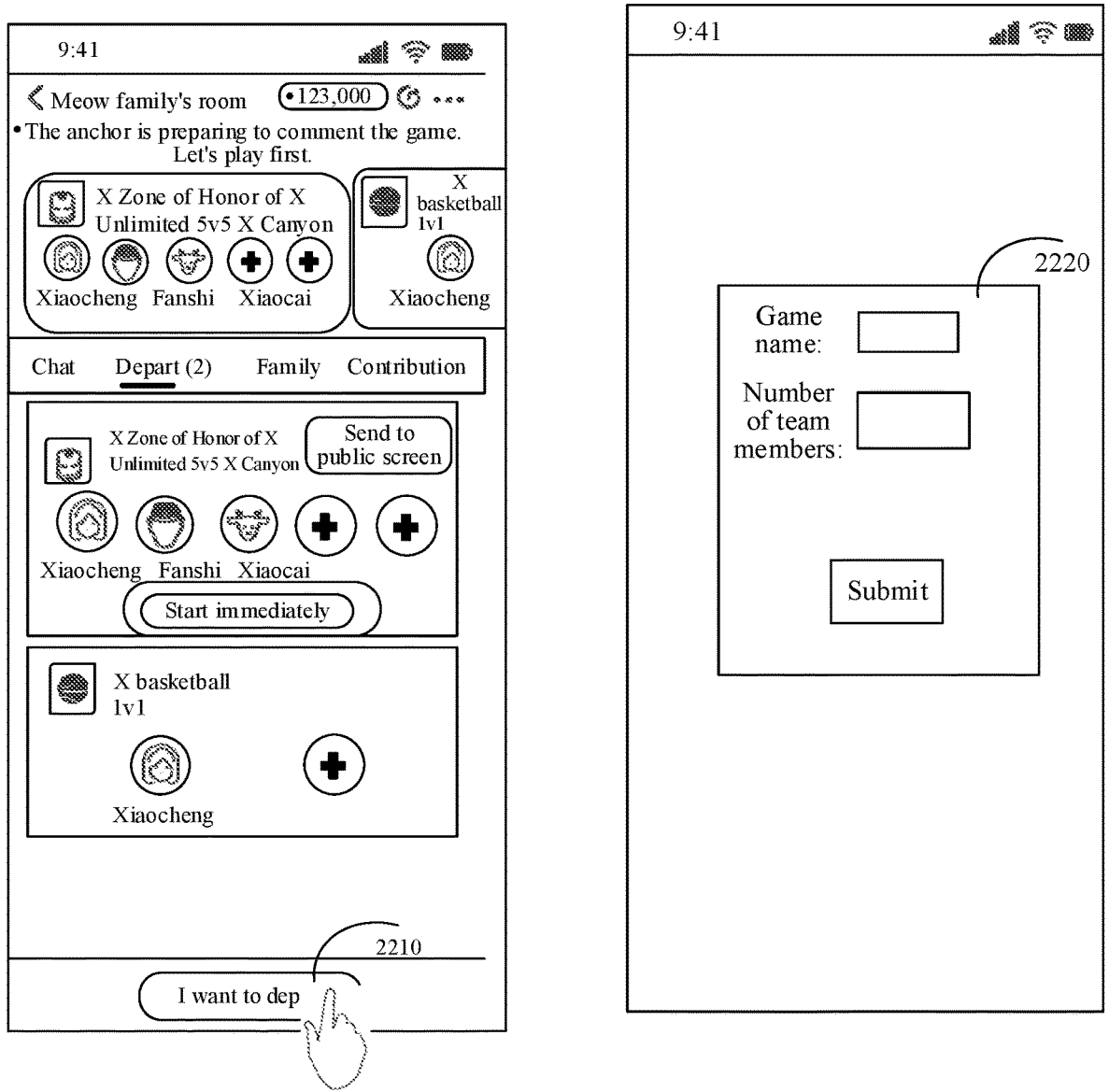
FIG. 22 is a schematic diagram of a creation interface according to an embodiment of the present disclosure.

Referring to FIG. 22, the video live streaming interface includes a display item creation option 2210. The user clicks the display item creation option 2210. The terminal displays a creation interface 2220.

In step 2106, relevant information of a display item of third game playing submitted in the creation interface is acquired.

In one embodiment, the relevant information includes at least one of the following: game name corresponding to game playing, and number of team members. In one embodiment, the creation interface includes a selection entry for the game name and a selection entry for the number of team members. The user selects the game in the selection entry for the game name and the number of team members in the selection entry for the number of team members. Exemplarily, the creation interface further includes an information submission entry. In response to receiving a trigger instruction for the submission entry, the terminal receives the relevant information of the display item of the third game playing submitted in the creation interface.

In step 2107, a creation request is transmitted to a server. The creation request is used for requesting to create the display item of the third game playing. The creation request includes the relevant information of the display item of the third game playing.

After the creation request from the terminal is received, the server generates an ID of the display item of the third game playing (also referred to as display item id), and transmits the ID of the display item of the third game playing to the terminal.

In step 2108, the display item of the third game playing is displayed.

After the ID of the display item of the third game playing is received, the terminal displays the display item of the third game playing.

It is to be understood that, both the audience and the anchor can create the display item of the game playing.

It is to be understood that, the execution sequence in this embodiment of the present disclosure is only exemplary. In one embodiment, the user may create a display item of game playing first and then initiate a game. The user may also initiate the game first and then create the display item of the game playing, which is not limited in this embodiment of the present disclosure.

It is to be understood that, the user may comment the game playing first and then create the display item of the game playing. The user may also create the display item of the game playing first and then comment the game playing, which is not limited in this embodiment of the present disclosure.

In this way, the anchor and the audience can create new display items of game playing according to their own needs, thus avoiding the waste of network resources and hardware resources caused by searching for display items of game playing that meet their needs.

It is to be understood that, the above steps executed by the terminal may be separately implemented as a method for live-streaming a video of game playing on the terminal side, and the steps executed by the server may be separately implemented as a method for transmitting a video of game playing on the server side.

The following is an apparatus embodiment of the present disclosure, which can be used to perform the method embodiments of the present disclosure. For details not disclosed in the apparatus embodiments of the present disclosure, refer to the method embodiments of the present disclosure.

Figure 23:
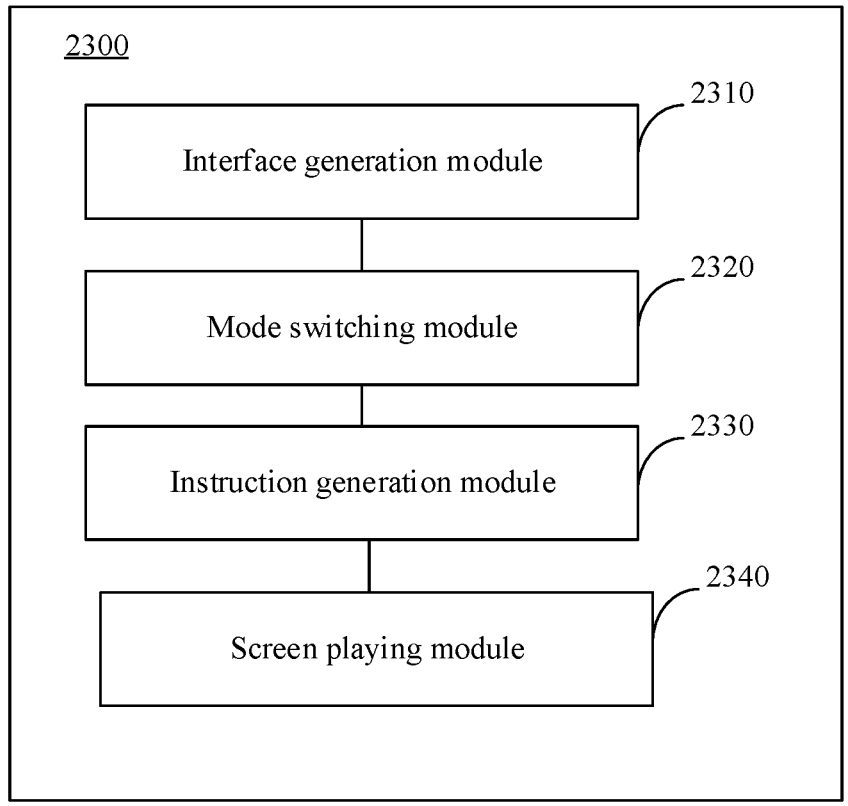
FIG. 23 is a block diagram of an apparatus for live-streaming a video of game playing according to an embodiment of the present disclosure.

FIG. 23 illustrates a schematic diagram of an apparatus for playing a video signal of multi-user interaction according to an embodiment of the present disclosure. The apparatus has an exemplary function of implementing the method for playing the video signal of multi-user interaction on the terminal side, and the function may be realized by hardware or by hardware executing corresponding software. The apparatus may be a terminal or may be disposed in a terminal. The apparatus 2300 may include:

an interface generation module 2310, configured to generate a video playing interface of a live streaming room, the video playing interface configured to play a multi-user interactive live streaming video signal initiated in the live streaming room:

a mode switching module 2320, configured to switch, in response to an anchor mode switching instruction, an operation mode of the video playing interface from a viewer mode to an anchor mode, where in the anchor mode, the video playing interface includes a display item of at least one multi-user interaction activity:

an instruction generation module 2330 configured to, in response to a trigger operation for a display item corresponding to a first multi-user interaction activity in the at least one multi-user interaction activity, generate a live streaming instruction for the first multi-user interaction activity in the at least one multi-user interaction activity: and a screen playing module 2340 configured to, in response to the live streaming instruction for the first multi-user interaction activity, play a live streaming video signal of the first multi-user interaction activity in the video playing interface, the live streaming video signal of the first multi-user interaction activity being transmitted to a client on a second terminal logged in by at least one user account in the live streaming room for playing.

To sum up, in the technical solution provided by this embodiment of the present disclosure, when the anchor mode switching instruction is received, the operation mode of the video playing interface is switched from the viewer mode to the anchor mode, so as to realize live streaming of the user interaction activity. The operation mode of the client provided by this embodiment of the present disclosure includes the viewer mode and the anchor mode, and the user can select to switch the operation mode of the client by himself, thus realizing the user's switching between the two identities of the anchor and the audience, and achieving high flexibility.

In addition, this embodiment of the present disclosure combines the viewer mode and the anchor mode into one client, thus avoiding the problem of downloading the anchor live streaming assistant in the related technology, saving the hardware resources and network resources occupied by the anchor in the operation process, simplifying the anchor operation process, and reducing the anchor operation cost.

In an exemplary embodiment, the mode switching module 2320 includes:
- an option display unit (not shown) configured to generate an anchor mode switching option: and
- a mode switching unit (not shown) configured to, in response to a selection operation for the anchor mode switching option, generate the anchor mode switching instruction and switch the operation mode from the viewer mode to the anchor mode.

In an exemplary embodiment, the mode switching module is configured to:
- transmitting a permission verification request to a server in response to the generated anchor mode switching instruction, the permission verification request being used for requesting to verify whether a currently logged-in first user account has an anchor permission:
- receive anchor mode configuration information from the server, the anchor mode configuration information being transmitted by the server when the first user account is determined to have the anchor permission:
- configure the anchor mode based on the anchor mode configuration information; and
- switch the operation mode from the viewer mode to the anchor mode.

In an exemplary embodiment, the display item of the multi-user interaction activity includes a live streaming trigger control corresponding to the multi-user interaction activity:

the instruction generation module 2330 is configured to:
- generate the live streaming instruction for the first multi-user interaction activity in
- response to a trigger operation for the live streaming trigger control in the display item corresponding to a first multi-user interaction activity.

In an exemplary embodiment, the screen playing module 2340 is configured to:
- transmit a video acquisition request to a server, the video acquisition request being used for requesting to acquire the live streaming video signal of the first multi-user interaction activity:
- receive video data from the server, the video data including the live streaming video signal of the first multi-user interaction activity: and
- play the live streaming video signal of the first multi-user interaction activity in the video playing interface based on the video data.

In an exemplary embodiment, the apparatus further includes:
- a data acquisition module (not shown), configured to acquire commenting audio data of the first multi-user interaction activity,
- where the commenting audio data of the first multi-user interaction activity and the live streaming video signal of the first multi-user interaction activity are synchronously pushed to a client on a second terminal logged in by at least one user account in the live streaming room for playing.

In an exemplary embodiment, the apparatus further includes:
- an interface display module (not shown), configured to display the OB setting interface in response to an opening operation for an observer OB setting interface corresponding to the first multi-user interaction activity; and
- a screen playing module 2340, configured to play the adjusted live streaming video signal of the first multi-user interaction activity in response to a setting operation in the OB setting interface.

In an exemplary embodiment, the screen playing module 2340 is configured to:
- transmit setting information to a server in response to the setting operation in the OB setting interface, the setting information being used for indicating the setting operation:
- receive adjusted video data from the server, the adjusted video data including the adjusted live streaming video signal of the first multi-user interaction activity, the adjusted live streaming video signal of the first multi-user interaction activity referring to the screen adjusted based on the setting information; and
- play the adjusted live streaming video signal of the first multi-user interaction activity.

In an exemplary embodiment, the mode switching module is further configured to switch the operation mode from the anchor mode to the viewer mode in response to a viewer mode switching instruction:
- the instruction receiving module is further configured to receive an interaction activity initiation instruction for a second multi-user interaction activity in the at least one multi-user interaction activity: and
- the interface display module is further configured to display a game playing interface of the second multi-user interaction activity.

In an exemplary embodiment, the apparatus further includes: an information acquisition module, a request transmitting module and a display item display module (not shown).

The interface display module is further configured to, in response to receiving a display item creation instruction, display a creation interface:
- the information acquisition module is configured to acquire relevant information of a display item of a third multi-user interaction activity submitted in the creation interface:
- the request transmitting module is configured to transmit a creation request to a server, the creation request is used for requesting to create the display item of the third multi-user interaction activity, and the creation request includes the relevant information of the display item of the third multi-user interaction activity: and
- the display item display module is configured to display the display item of the third multi-user interaction activity.

Figure 24:
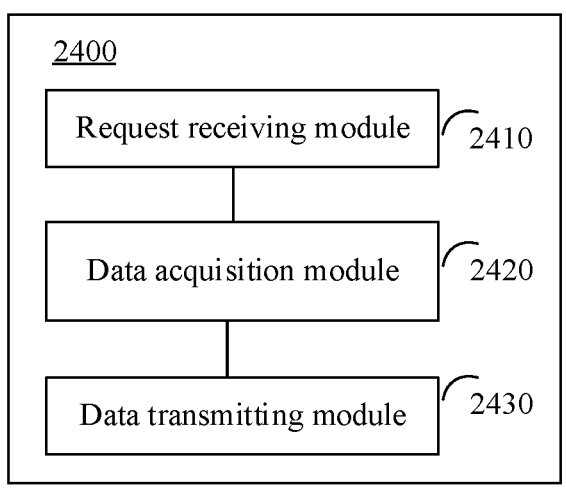
FIG. 24 is a block diagram of an apparatus for transmitting a video of game playing according to an embodiment of the present disclosure.

FIG. 24 illustrates a block diagram of an apparatus for transmitting a video signal of a multi-user interaction activity according to an embodiment of the present disclosure. The apparatus has an exemplary function of implementing the method for transmitting the video signal of the multi-user interaction activity on the server side, and the function may be realized by hardware or by hardware executing corresponding software. The apparatus may be a server or may be provided in a server. The apparatus 2400 may include:
- a request receiving module 2410, configured to receive a video acquisition request from a client, the video acquisition request including ID information of a first multi-user interaction activity, the first multi-user interaction activity being a multi-user interaction activity initiated in a live streaming room of a target group:

a data acquisition module 2420, configured to acquire, based on the ID information of the first multi-user interaction activity, video data of the first multi-user interaction activity: and a data transmitting module 2430, configured to transmit the video data to the client, the video data including a live streaming video signal of the first multi-user interaction activity, the live streaming video of the first multi-user interaction activity being pushed to the client logged in by at least one user account in the live streaming room for playing.

Still referring to FIG. 24, an embodiment of the present disclosure further provides an apparatus for playing a video signal of multi-user interaction. In the apparatus 2400, the request receiving module 2410 is configured to receive a permission verification request from a first terminal, and the permission verification request includes a first user account and an ID of a live streaming room of a target group:

the request receiving module 2410 is further configured to determine, based on the first user account and the ID of the live streaming room, a verification result, and the verification result is used for indicating whether the first user account has an anchor permission: and The data transmitting module 2430 is configured to transmit, when the first user account is determined to have the anchor permission, anchor mode configuration information to the first terminal, so that the first terminal configures an anchor mode based on the anchor mode configuration information, and switches an operation mode of the video playing interface from a viewer mode to the anchor mode, and the video playing interface is used for playing a multi-user interactive live streaming video signal initiated in the live streaming room.

To sum up, in the technical solution provided by this embodiment of the present disclosure, when the anchor mode switching instruction is received, the operation mode is switched from the viewer mode to the anchor mode, so as to realize live streaming of the multi-user interaction activity. The operation mode of the client provided by this embodiment of the present disclosure includes the viewer mode and the anchor mode, and the user can select to switch the operation mode of the client by himself, thus realizing the user's switching between the two identities of the anchor and the audience, and achieving high flexibility.

In addition, this embodiment of the present disclosure combines the viewer mode and the anchor mode into one client, thus avoiding the problem of downloading the anchor live streaming assistant in the related technology, saving the hardware resources and network resources occupied by the anchor in the operation process, simplifying the anchor operation process, and reducing the anchor operation cost.

It is to be understood that, When the apparatus provided in the foregoing embodiments implements functions of the apparatus, the division of the foregoing functional modules is merely an example for description. In the practical application, the functions may be assigned to and completed by different functional modules according to the requirements, that is, the content structure of the device is divided into different functional modules, to implement all or some of the functions described above. In addition, the apparatus and method embodiments provided in the foregoing embodiments belong to the same conception. For the specific implementation process, reference may be made to the method embodiments, and details are not described herein again.

The term module (and other similar terms such as sub-module, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 25:
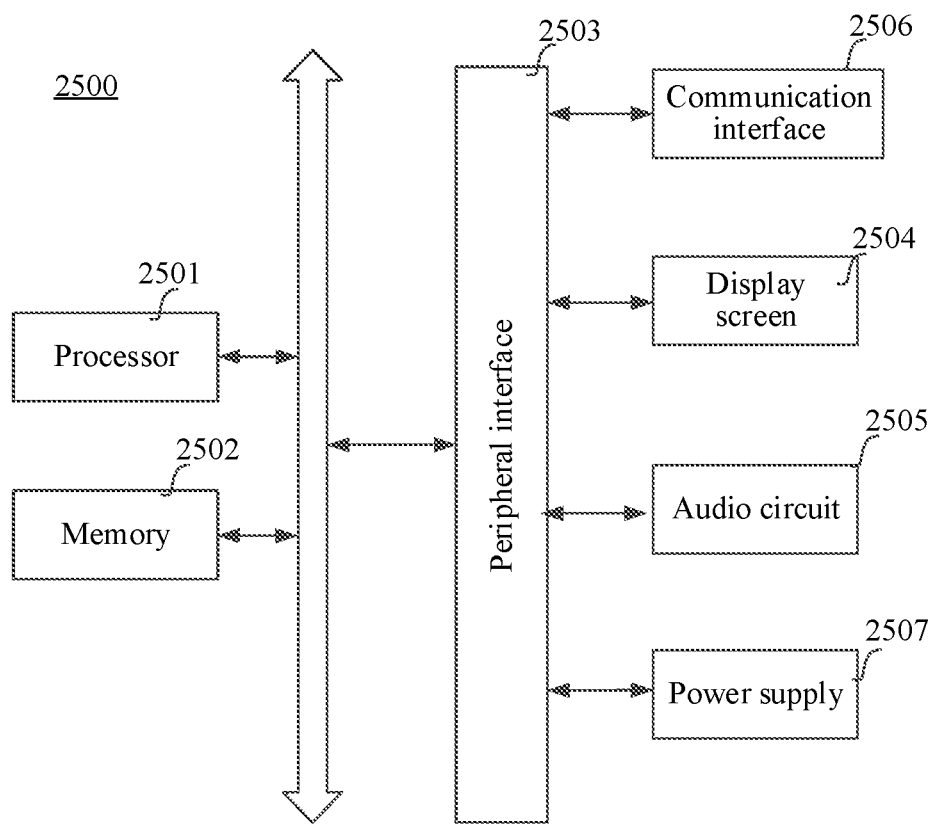
FIG. 25 is a structural block diagram of a terminal according to an embodiment of the present disclosure.

FIG. 25 illustrates a structural block diagram of a terminal 2500 according to an embodiment of the present disclosure. The terminal 2500 may be a mobile phone, a tablet computer, a smart television, a multimedia playback device, or a PC. The terminal 2500 may be the terminal 10 described in the embodiment of FIG. 1.

Generally, the terminal 2500 includes: a processor 2501 and a memory 2502.

The processor 2501 may include one or more processing cores, and may be, for example, a 4-core processor or an 8-core processor. The processor 2501 may be implemented by using at least one hardware form of a digital signal processor (DSP), a field programmable gate array (FPGA), and a programmable logic array (PLA). The processor 2501 further includes a main processor and a coprocessor. The main processor is configured to process data in an active state, also referred to as a central processing unit (CPU). The coprocessor is a low power consumption processor configured to process data in a standby state. In some embodiments, the processor 2501 may be integrated with a graphics processing unit (GPU). The GPU is configured to be responsible for rendering and drawing content that a display needs to display. In some embodiments, the processor 2501 may further include an artificial intelligence (AI) processor. The AI processor is configured to process a computing operation related to machine learning.

The memory 2502 may include one or more computer-readable storage media. The computer-readable storage media may be non-transitory. The memory 2502 may also include a high-speed random access memory, as well as non-volatile memory, such as one or more disk storage devices and flash storage devices.

In some embodiments, the terminal 2500 further includes: a peripheral interface 2503 and at least one peripheral device. The processor 2501, the memory 2502, and the peripheral interface 2503 may be connected through a bus or a signal cable. Each peripheral device may be connected to the peripheral device interface 2503 by using a bus, a signal line, or a circuit board. Specifically, the peripheral device may include: at least one of a display screen 2504, an audio circuit 2505, a communication interface 2506 and a power supply 2507.

A person skilled in the art may understand that the structure shown in FIG. 25 constitutes no limitation on the terminal 2500, and the terminal may include more or fewer components than those shown in the figure, or some components may be combined, or a different component deployment may be used.

Figure 26:
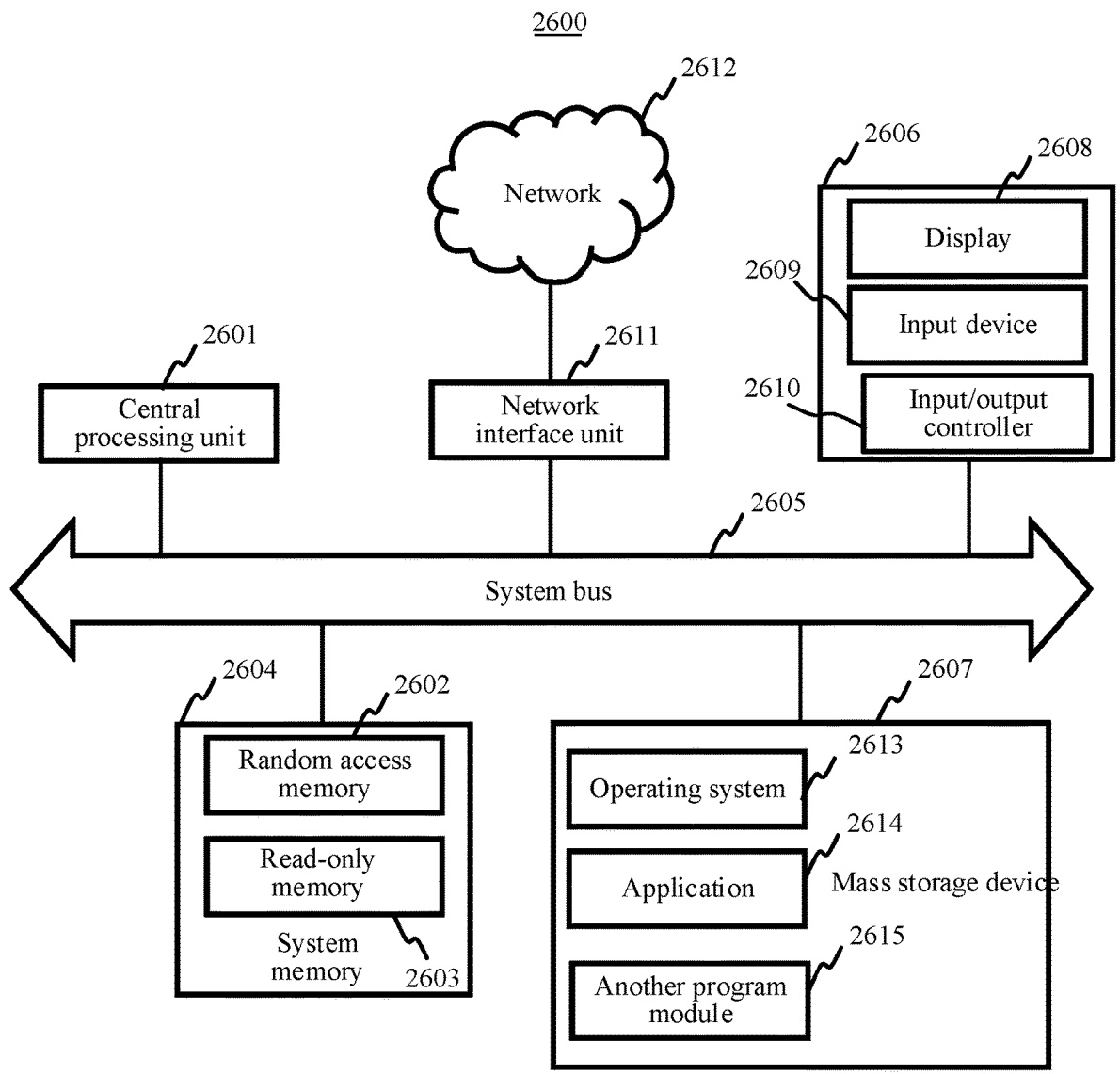
FIG. 26 is a schematic structural diagram of a server according to an embodiment of the present disclosure.

FIG. 26 illustrates a schematic structural diagram of a server 2600 according to an embodiment of the present disclosure. The server 2600 may be configured to implement the method for transmitting the video of game playing on the server side according to this embodiment of the present disclosure. The server 2600 may be the server described in the embodiment in FIG. 1. Specifically, The server 2600 includes a central processing unit (CPU) 2601, a system memory 2604 including a random access memory (RAM) 2602 and a read only memory (ROM) 2603, and a system bus 2605 connecting the system memory 2604 and the central processing unit 2601. The server 2600 further includes a basic input/output system (I/O system) 2606 configured to transmit information between components in the computer, and a mass storage device 2607 configured to store an operating system 2613, an application 2614, and another program module 2615.

The basic input/output system 2606 includes a display 2608 configured to display information and an input device 2609 such as a mouse and a keyboard for a user to input information. The display 2608 and the input device 2609 are both connected to the central processing unit 2601 through an input/output controller 2610 connected to the system bus 2605. The basic input/output system 2606 may further include the input/output controller 2610 for receiving and processing input from a plurality of other devices such as a keyboard, a mouse, an electronic stylus, or the like. Similarly, the input/output controller 2610 further provides output to a display screen, a printer, or other types of output devices.

The mass storage device 2607 is connected to the central processing unit 2601 through a mass storage controller (not shown) connected to the system bus 2605. The mass storage device 2607 and an associated computer-readable medium provide non-volatile storage for the server 2600. That is, the mass storage device 2607 may include a computer-readable medium (not shown) such as a hard disk or a compact disc read-only memory (CD-ROM) drive.

In general, the computer-readable medium may include a computer storage medium and a communication medium. The computer storage medium includes volatile and non-volatile, removable and non-removable media that are configured to store information such as computer-readable instructions, data structures, program modules, or other data and that are implemented by using any method or technology. The computer storage medium includes a RAM, a ROM, an erasable programmable read-only memory (EPROM), an electrically erasable programmable read-only memory (EEPROM), a flash memory or another solid-state storage device, a CD-ROM, a digital versatile disc (DVD) or another optical memory, a tape cartridge, a magnetic cassette, a magnetic disk memory, or another magnetic storage device. Certainly, a person skilled in the art may learn that the computer storage medium is not limited to the above. The foregoing system memory 2604 and mass storage device 2607 may be collectively referred to as a memory.

According to various embodiments of the present disclosure, the server 2600 may further be connected, by using a network such as the Internet, to a remote computer on the network and run. That is, the server 2600 may be connected to a network 2612 by using a network interface unit 2611 connected to the system bus 2605, or may be connected to another type of network or a remote computer system (not shown) by using the network interface unit 2611.

The memory further includes one or more programs. The one or more programs are stored in the memory and configured to be executed by one or more processors. The one or more programs include instructions used for performing the video transmission method for game playing of the server side.

In an exemplary embodiment, a terminal is further provided, including a processor and a memory, the memory storing at least one instruction, at least one program, a code set, or an instruction set. The at least one instruction, the at least one program, the code set, or the instruction set is configured to be executed by one or more processors to implement the method for live-streaming a video of game playing on the terminal side.

In an exemplary embodiment, a server is further provided, including a processor and a memory, the memory storing at least one instruction, at least one program, a code set, or an instruction set. The at least one instruction, the at least one program, the code set, or the instruction set is configured to be executed by one or more processors to implement the method for transmitting a video of game playing on the server side.

In an exemplary embodiment, a computer-readable storage medium is further provided, the storage medium storing at least one instruction, at least one program, a code set, or an instruction set, the at least one instruction, the at least one program, the code set, or the instruction set, when executed by a processor of a terminal, implementing the method for live-streaming a video of game playing on the terminal side, and the method for transmitting a video of game playing on the server side.

In some embodiments, the computer-readable storage medium may be a read-only memory (ROM), a random access memory (RAM), a compact disc read-only memory (CD-ROM), a magnetic tape, a floppy disk, an optical data storage device, or the like.

In an exemplary embodiment, a computer program product or a computer program is provided, including computer instructions, the computer instructions being stored in a computer-readable storage medium. A processor of the terminal reads the computer instructions from the computer-readable storage medium, and executes the computer instructions, to cause the terminal to perform the method for playing the video of game playing on the terminal side or to cause the server to perform the method for transmitting the video of game playing on the server side.

It is to be understood that "plurality of" mentioned in this specification means two or more. And/or describes an association relationship for describing associated objects and represents that three relationships may exist. For example, A and/or B may represent the following three cases: only A exists, both A and B exist, and only B exists. The character "/" generally indicates an "or" relationship between the associated objects. In addition, the step numbers described in this specification merely schematically show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the present disclosure.

A person of ordinary skill in the art may understand that all or part of the steps of implementing the foregoing embodiments may be implemented by hardware, or may be implemented by a program instructing related hardware. The program may be stored in a computer-readable storage medium. The storage medium mentioned may be a read-only memory, a magnetic disk or an optical disc.

The foregoing descriptions are merely examples of the embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. A method for playing a video signal of multi-user interaction, executed by a first terminal, the method comprising:
generating a video playing interface of a live streaming room, the video playing interface being configured to play a multi-user interactive live streaming video signal initiated in the live streaming room;
switching an operation mode of the video playing interface from a viewer mode to an anchor in response to an anchor mode switching instruction, wherein in the anchor mode, the video playing interface comprises a first list entry configured to display a list of multi-user interaction activities that are already in progress and a second list entry configured to display a list of multi-user interaction activities that are not in progress;
displaying, on the video playing interface, at least one display item of at least one multi-user interaction activity corresponding to the first list entry;
generating a live streaming instruction for a first multi-user interaction activity in the at least one multi-user interaction activity in response to a trigger operation for one of the at least one display item corresponding to the first multi-user interaction activity in the at least one multi-user interaction activity, the first multi-user interaction activity being a game playing that is already in progress; and
playing a live streaming video signal of the first multi-user interaction activity in the video playing interface in response to the live streaming instruction for the first multi-user interaction activity, the live streaming video signal of the first multi-user interaction activity being transmitted to a client on a second terminal logged in by at least one user account in the live streaming room.

2. The method according to claim 1, wherein the switching an operation mode of the video playing interface from a viewer mode to an anchor mode in response to an anchor mode switching instruction comprises:
generating an anchor mode switching option; and
generating the anchor mode switching instruction and switching the operation mode from the viewer mode to the anchor mode in response to a selection operation for the anchor mode switching option.

3. The method according to claim 2, wherein the generating the anchor mode switching instruction and switching the operation mode from the viewer mode to the anchor mode in response to a selection operation for the anchor mode switching option comprises:
transmitting a permission verification request to a server in response to the anchor mode switching instruction, the permission verification request being used for requesting to verify whether a currently logged-in first user account has an anchor permission;
receiving anchor mode configuration information from the server, the anchor mode configuration information being transmitted by the server when the first user account is determined to have the anchor permission;
configuring the anchor mode based on the anchor mode configuration information; and
switching the operation mode from the viewer mode to the anchor mode.

4. The method according to claim 1, wherein the display item of the multi-user interaction activity comprises a live streaming trigger control corresponding to the multi-user interaction activity; and
the generating a live streaming instruction for a first multi-user interaction activity in the at least one multi-user interaction activity comprises:
generating the live streaming instruction for the first multi-user interaction activity in response to a trigger operation for the live streaming trigger control in the display item corresponding to the first multi-user interaction activity.

5. The method according to claim 1, wherein the playing a live streaming video signal of the first multi-user interaction activity in the video playing interface comprises:
transmitting a video acquisition request to a server, the video acquisition request being used for requesting to acquire the live streaming video signal of the first multi-user interaction activity;
receiving video data from the server, the video data comprising the live streaming video signal of the first multi-user interaction activity; and
playing the live streaming video signal of the first multi-user interaction activity in the video playing interface based on the video data.

6. The method according to claim 1, wherein the method further comprises:
acquiring commenting audio data of the first multi-user interaction activity,
wherein the commenting audio data of the first multi-user interaction activity and the live streaming video signal of the first multi-user interaction activity are synchronously pushed to a client on a second terminal logged in by at least one user account in the live streaming room for playing.

7. The method according to claim 1, wherein the method further comprises:
displaying an observer setting interface in response to an opening operation for the observer setting interface corresponding to the first multi-user interaction activity; and
playing an adjusted live streaming video signal of the first multi-user interaction activity in response to a setting operation in the observer setting interface.

8. The method according to claim 7, wherein the playing the adjusted live streaming video signal of the first multi-user interaction activity in response to a setting operation in the observer setting interface comprises:
transmitting setting information to a server in response to the setting operation in the observer setting interface, the setting information indicating the setting operation;
receiving adjusted video data from the server, the adjusted video data comprising the live streaming video signal of the first multi-user interaction activity adjusted based on the setting information.

9. The method according to claim 1, wherein the method further comprises:
switching the operation mode from the anchor mode to the viewer mode in response to a viewer mode switching instruction;
receiving an interaction activity initiation instruction for a second multi-user interaction activity in the at least one multi-user interaction activity; and
displaying a game playing interface of the second multi-user interaction activity.

10. The method according to claim 1, wherein the method further comprises:
displaying a creation interface in response to receiving a display item creation instruction;

acquiring relevant information of a display item of a third multi-user interaction activity submitted in the creation interface;

transmitting a creation request to a server, the creation request being used for requesting to create the display item of the third multi-user interaction activity, the creation request comprising the relevant information of the display item of the third multi-user interaction activity; and displaying the display item of the third multi-user interaction activity.

11. The method according to claim 1, wherein the displayed first items of the video signal of the multi-user interaction include a live streaming trigger control corresponding to a first game playing, the method further comprises:

when the live streaming trigger control is selected, displaying a live streaming video screen of the first game playing.

12. The method according to claim 1, wherein the first terminal is logged in with a first user account, the switching the operation mode of the video playing interface from the viewer mode to the anchor in response to the anchor mode switching instruction is initiated by the first user account itself at the first terminal, and the anchor mode switching instruction includes switching an identity of the first user account from an audience identity to an anchor identity.

13. An apparatus for playing a signal of multi-user interaction, the apparatus comprising:

a processor and a memory, the memory storing at least one instruction, at least one program, a code set, or an instruction set, the at least one instruction, the at least one program, the code set or the instruction set being loaded and executed by the processor to implement:

generating a video playing interface of a live streaming room, the video playing interface being configured to play a multi-user interactive live streaming video signal initiated in the live streaming room;

switching an operation mode of the video playing interface from a viewer mode to an anchor in response to an anchor mode switching instruction, wherein in the anchor mode, the video playing interface comprises a first list entry configured to display a list of multi-user interaction activities that are already in progress and a second list entry configured to display a list of multi-user interaction activities that are not in progress;

displaying, on the video playing interface, at least one display item of at least one multi-user interaction activity corresponding to the first list entry;

generating a live streaming instruction for a first multi-user interaction activity in the at least one multi-user interaction activity in response to a trigger operation for one of the at least one display item corresponding to the first multi-user interaction activity in the at least one multi-user interaction activity, the first multi-user interaction activity being a game playing that is already in progress; and playing a live streaming video signal of the first multi-user interaction activity in the video playing interface in response to the live streaming instruction for the first multi-user interaction activity, the live streaming video signal of the first multi-user interaction activity being transmitted to a client on a second terminal logged in by at least one user account in the live streaming room for playing.

14. The apparatus according to claim 13, wherein the switching an operation mode of the video playing interface from a viewer mode to an anchor mode in response to an anchor mode switching instruction comprises:

generating an anchor mode switching option; and generating the anchor mode switching instruction and switching the operation mode from the viewer mode to the anchor mode in response to a selection operation for the anchor mode switching option.

15. The apparatus according to claim 14, wherein the generating the anchor mode switching instruction and switching the operation mode from the viewer mode to the anchor mode in response to a selection operation for the anchor mode switching option comprises:

transmitting a permission verification request to a server in response to the anchor mode switching instruction, the permission verification request being used for requesting to verify whether a currently logged-in first user account has an anchor permission;

receiving anchor mode configuration information from the server, the anchor mode configuration information being transmitted by the server when the first user account is determined to have the anchor permission;

configuring the anchor mode based on the anchor mode configuration information; and switching the operation mode from the viewer mode to the anchor mode.

16. The apparatus according to claim 13, wherein the display item of the multi-user interaction activity comprises a live streaming trigger control corresponding to the multi-user interaction activity; and the generating a live streaming instruction for a first multi-user interaction activity in the at least one multi-user interaction activity comprises:

generating the live streaming instruction for the first multi-user interaction activity in response to a trigger operation for the live streaming trigger control in the display item corresponding to the first multi-user interaction activity.

17. The apparatus according to claim 13, wherein the playing a live streaming video signal of the first multi-user interaction activity in the video playing interface comprises:

transmitting a video acquisition request to a server, the video acquisition request being used for requesting to acquire the live streaming video signal of the first multi-user interaction activity;

receiving video data from the server, the video data comprising the live streaming video signal of the first multi-user interaction activity; and playing the live streaming video signal of the first multi-user interaction activity in the video playing interface based on the video data.

18. The apparatus according to claim 13, wherein the processor is further configured to perform:

acquiring commenting audio data of the first multi-user interaction activity, wherein the commenting audio data of the first multi-user interaction activity and the live streaming video signal of the first multi-user interaction activity are synchronously pushed to a client on a second terminal logged in by at least one user account in the live streaming room for playing.

19. The apparatus according to claim 13, wherein the processor is further configured to perform:

displaying an observer setting interface in response to an opening operation for the observer setting interface corresponding to the first multi-user interaction activity; and playing an adjusted live streaming video signal of the first multi-user interaction activity in response to a setting operation in the observer setting interface.

20. A non-transitory computer-readable storage medium, storing at least one instruction, at least one program, a code set, or an instruction set, the at least one instruction, the at least one program, the code set, or the instruction set being loaded and executed by a processor to implement:

generating a video playing interface of a live streaming room logged in with a first user account, the video playing interface being configured to play a multi-user interactive live streaming video signal initiated in the live streaming room;

switching an operation mode of the video playing interface from a viewer mode to an anchor in response to an anchor mode switching instruction, wherein in the anchor mode, the video playing interface comprises a first list entry configured to display a list of multi-user interaction activities that are already in progress and a second list entry configured to display a list of multi-user interaction activities that are not in progress;

displaying, on the video playing interface, at least one display item of at least one multi-user interaction activity corresponding to the first list entry;

generating a live streaming instruction for a first multi-user interaction activity in the at least one multi-user interaction activity in response to a trigger operation for one of the at least one display item corresponding to the first multi-user interaction activity in the at least one multi-user interaction activity, the first multi-user interaction activity being a game playing that is already in progress; and playing a live streaming video signal of the first multi-user interaction activity in the video playing interface in response to the live streaming instruction for the first multi-user interaction activity, the live streaming video signal of the first multi-user interaction activity being transmitted to a client on a second terminal logged in by at least one user account in the live streaming room.

* * * * *